(12) United States Patent (10) Patent No.: US 8,302,280 B2
Neff et al. (45) Date of Patent: Nov. 6, 2012

(54) APPLIANCE COMPRISING POLYURETHANE FOAM

(75) Inventors: Raymond A. Neff, Northville, MI (US); Lucyanne Carmona, Canton, MI (US); David R. Phelps, Ferndale, MI (US)

(73) Assignee: BASF SE, Rheinland-Pfalz (DE)

( * ) Notice: Subject to any disclaimer, the term of this patent is extended or adjusted under 35 U.S.C. 154(b) by 388 days.

(21) Appl. No.: 12/686,220

(22) Filed: Jan. 12, 2010

(65) Prior Publication Data

US 2011/0168217 A1 Jul. 14, 2011

(51) Int. Cl.
*B23B 3/26* (2006.01)
(52) U.S. Cl. ............... 29/428; 134/200; 68/3 R
(58) Field of Classification Search .............. 134/200; 68/3 R
See application file for complete search history.

(56) References Cited

U.S. PATENT DOCUMENTS

| | | | |
|---|---|---|---|
| 3,421,597 A * | 1/1969 | Hans et al. ................ | 181/290 |
| 3,591,532 A | 7/1971 | Abercrombie et al. | |
| 3,862,880 A * | 1/1975 | Feldman .................. | 428/319.9 |
| 4,005,919 A * | 2/1977 | Hoge et al. ............... | 312/406 |
| 4,839,397 A | 6/1989 | Lohmar et al. | |
| 4,901,676 A * | 2/1990 | Nelson .................... | 122/19.2 |
| 4,916,167 A * | 4/1990 | Chen et al. ............... | 521/159 |
| 5,965,851 A * | 10/1999 | Herreman et al. ......... | 181/200 |
| 6,878,427 B2 * | 4/2005 | Schmidt et al. ........... | 428/71 |
| 2004/0241479 A1 | 12/2004 | Domine et al. | |
| 2005/0079739 A1 | 4/2005 | Illerhaus | |
| 2005/0112355 A1 | 5/2005 | Wycech | |
| 2007/0003712 A1 | 1/2007 | Domine | |
| 2008/0309210 A1 | 12/2008 | Luisi et al. | |

FOREIGN PATENT DOCUMENTS

| | | | |
|---|---|---|---|
| DE | 10118632 A1 | | 10/2002 |
| EP | 449331 A2 | | 10/1991 |
| FR | 2 688 971 | * | 9/1993 |
| GB | 1 593 386 | * | 7/1981 |
| GB | 2 444 273 | * | 6/2008 |
| JP | 61-085430 | * | 5/1996 |
| WO | WO 2011/086076 A1 | | 7/2011 |

OTHER PUBLICATIONS

"Information on Flexible Polyurethane Foam", In Touch, May 1991, vol. 1, No. 2, Polyurethane Foam Association, Wayne, NJ, 4 pages.
International Search Report and Written Opinion for PCT Application No. PCT/EP2011/050297 dated May 9, 2011; 11 pages.

* cited by examiner

*Primary Examiner* — Frankie L Stinson
(74) *Attorney, Agent, or Firm* — Howard & Howard Attorneys PLLC

(57) ABSTRACT

An appliance includes a housing having top and bottom panels disposed opposite each other and a plurality of walls connected to the top and bottom panels. The top and bottom panels and the plurality of walls define a cavity of the appliance. The housing also has an outermost surface about which a polyurethane foam is disposed. The polyurethane foam reduces noise and vibrations emitted from the appliance during use and has a density of from 20 to 50 pounds per cubic foot (pcf). The polyurethane foam also has a damping factor of at least 0.2 measured at a temperature of from 40° C. to 60° C. Furthermore, the polyurethane foam has a k-factor of less than 2.0 btu-in/hr-ft²-° F. which reduces an amount of energy required to operate the appliance. The appliance is formed by applying the polyurethane foam to at least one of the top panel, bottom panel, and plurality of walls.

28 Claims, 15 Drawing Sheets

APPLIANCE COMPRISING POLYURETHANE FOAM

FIELD OF THE INVENTION

The subject invention generally relates to an appliance and a method of forming the appliance. The appliance includes a polyurethane foam that has specific damping and thermal properties and reduces noise, vibration, and energy consumption of the appliance.

DESCRIPTION OF THE RELATED ART

Appliances such as dishwashers, washing machines, and clothes dryers are typically fabricated from stainless steel in combination with other metals and plastics. When used, these appliances tend to produce high levels of noise and vibration which reverberate in the metals and are commercial undesirable. In dishwashers, the noise and vibration typically originate from water spray, from water pumps, and from various internal mechanisms.

Efforts have been made to minimize these noises and vibrations. Typically, asphalt mastic coverings and/or fiberglass coverings are adhered to external surfaces of the appliances to reduce noise and absorb vibrations. However, these coverings significantly increase the thermal mass of the appliance which results in greater energy consumption and higher cost of use. For example, when a dishwasher is operated, the interior is heated to a pre-selected temperature. However, due to heat transfer from the interior of the appliance through the metals to the external surfaces of the appliance, the asphalt mastic covering is also heated. Since the appliance and the asphalt mastic covering have a combined high thermal mass, long heating times and large amounts of energy are required. This not only increases energy usage but also increases costs, both of which are commercially undesirable.

Current federal standards, along with proposed 2012 Federal Energy Star requirements, greatly limit amounts of energy that typical appliances can consume. Furthermore, reducing energy consumption is commercially desirable. Accordingly, there remains an opportunity to develop an appliance that operates with reduced noise and vibrations and that is simultaneously energy efficient. There also remains an opportunity to develop a method for forming such an improved appliance.

SUMMARY OF THE INVENTION AND ADVANTAGES

The instant invention provides an appliance including a housing having a top panel and a bottom panel that are disposed opposite each other. The housing also has a plurality of walls connected to the top and bottom panels. The top and bottom panels and the plurality of walls define a cavity. The housing also has an outermost surface about which a polyurethane foam is disposed. The polyurethane foam includes the reaction product of an isocyanate composition and a resin composition including at least one polyol. The polyurethane foam also has a density of from 20 to 50 pounds per cubic foot (pcf) as determined according to ASTM D 1622 and a damping factor of at least 0.2 measured at a temperature of from 40° C. to 60° C. as determined according to ASTM D 4065. Furthermore, the polyurethane foam has a k-factor of less than 2.0 btu-in/hr-ft$^2$-° F. as determined according to ASTM C 518. The appliance is formed using a method that includes the steps of applying the polyurethane foam to at least one of the top panel, bottom panel, and plurality of walls. The polyurethane foam of this invention reduces noise and vibrations produced by the appliance while simultaneously reducing an amount of energy needed to operate the appliance.

BRIEF DESCRIPTION OF THE DRAWINGS

Other advantages of the present invention will be readily appreciated, as the present invention becomes better understood by reference to the following detailed description when considered in connection with the accompanying drawings wherein.

DETAILED DESCRIPTION OF THE INVENTION

Figure 1:
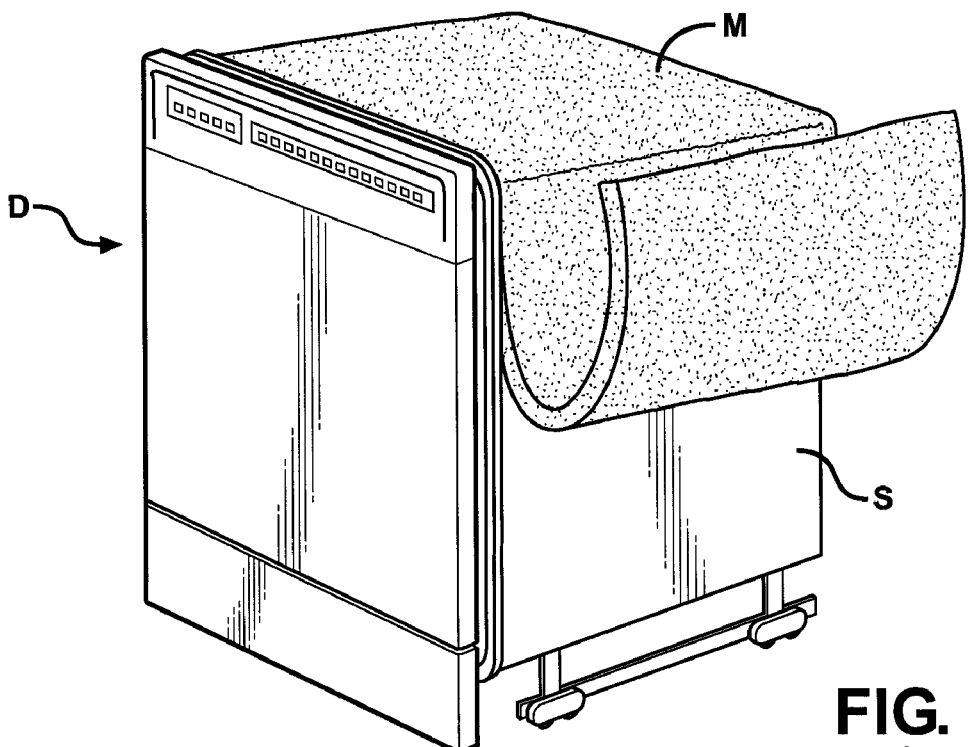
FIG. 1 is a perspective view of a dishwasher (D) of the prior art including an asphalt mastic covering (M) disposed about an outermost surface (S) of the dishwasher.
Figure 2:
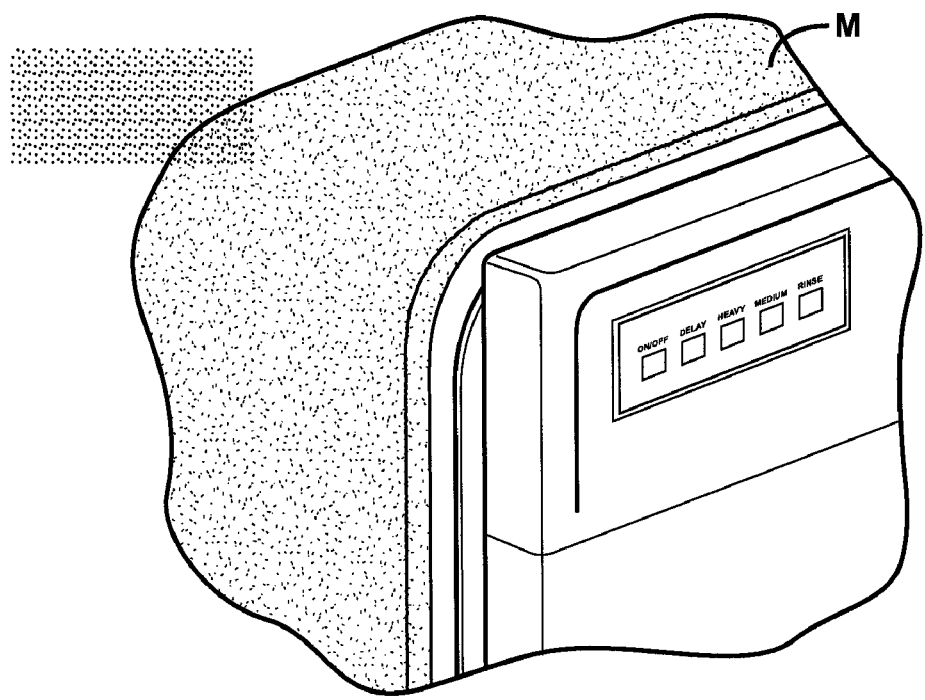
FIG. 2 is an enlarged perspective view of the dishwasher of FIG. 1 and also represents the prior art.
Figure 3:
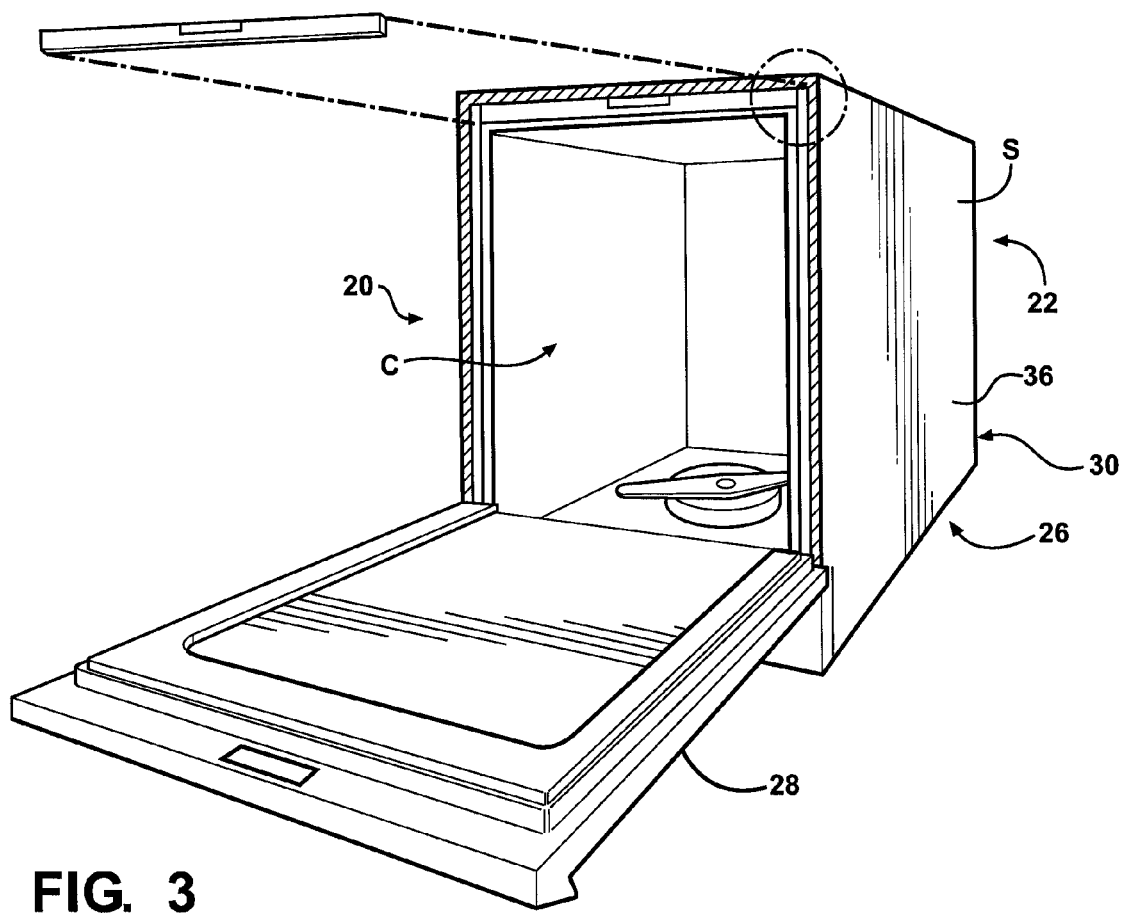
FIG. 3 is a perspective view an embodiment of a dishwasher of the instant invention prior to application of a polyurethane foam disposed about at least a portion of an outermost surface of the dishwasher.
Figure 3A:
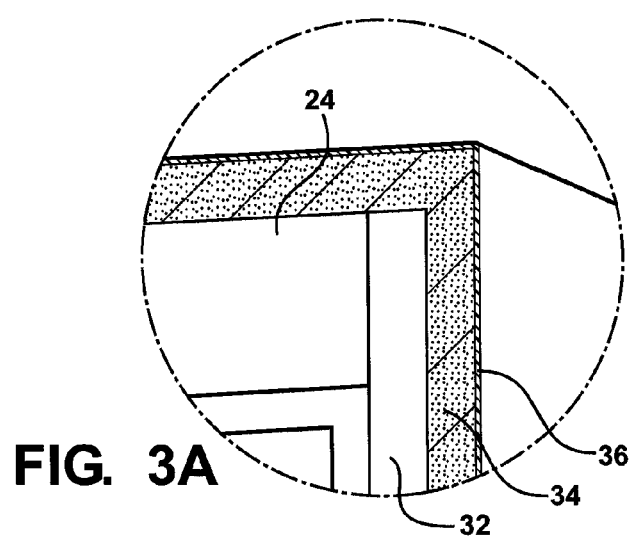
FIG. 3A is an enlarged perspective view of the dishwasher of FIG. 3.
Figure 4:
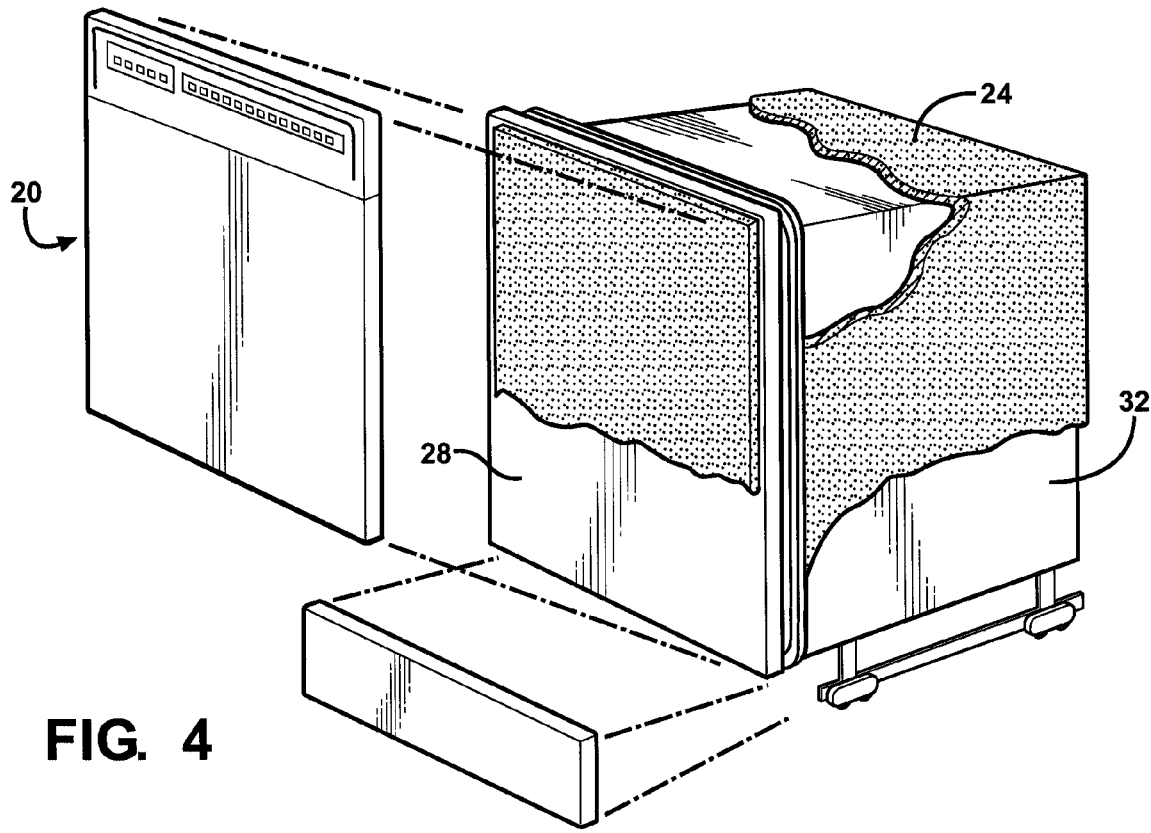
FIG. 4 is an exploded perspective view of an embodiment of a dishwasher of the instant invention wherein a polyurethane foam is disposed about at least a portion of an outermost surface of the dishwasher.
Figure 5:
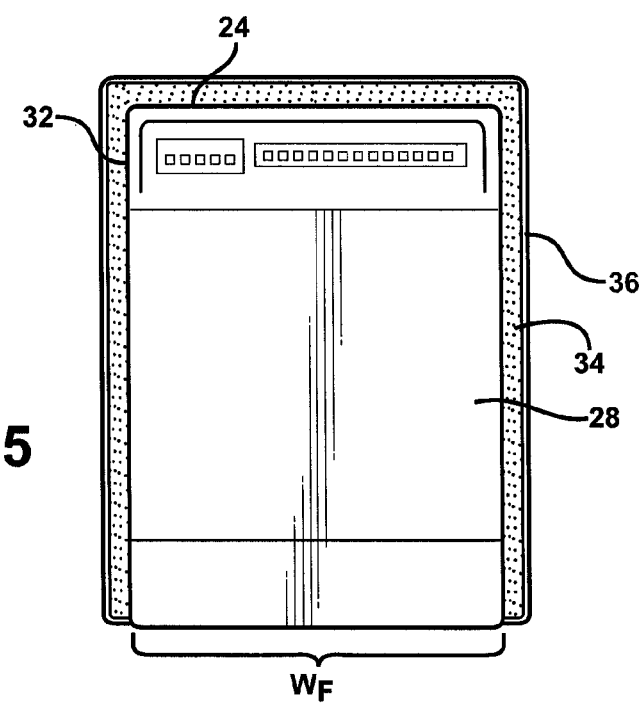
FIG. 5 is a front view of an embodiment of a dishwasher of the instant invention illustrating a polyurethane foam is disposed about at least a portion of a top panel and two side walls.
Figure 6:
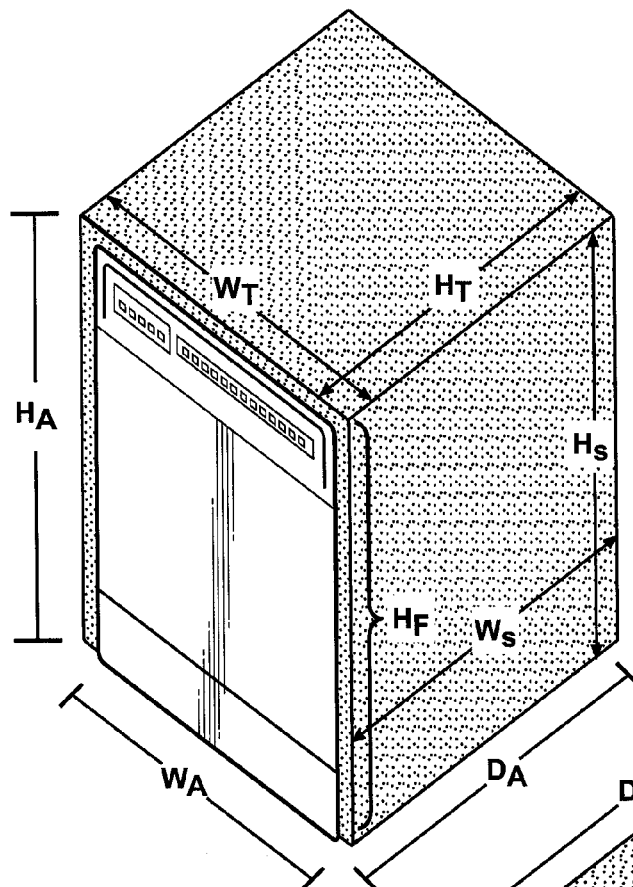
FIG. 6 is a front perspective view of another embodiment of the dishwasher of the instant invention illustrating a polyurethane foam that is disposed about at least a portion of a top panel and two side walls.
Figure 7:
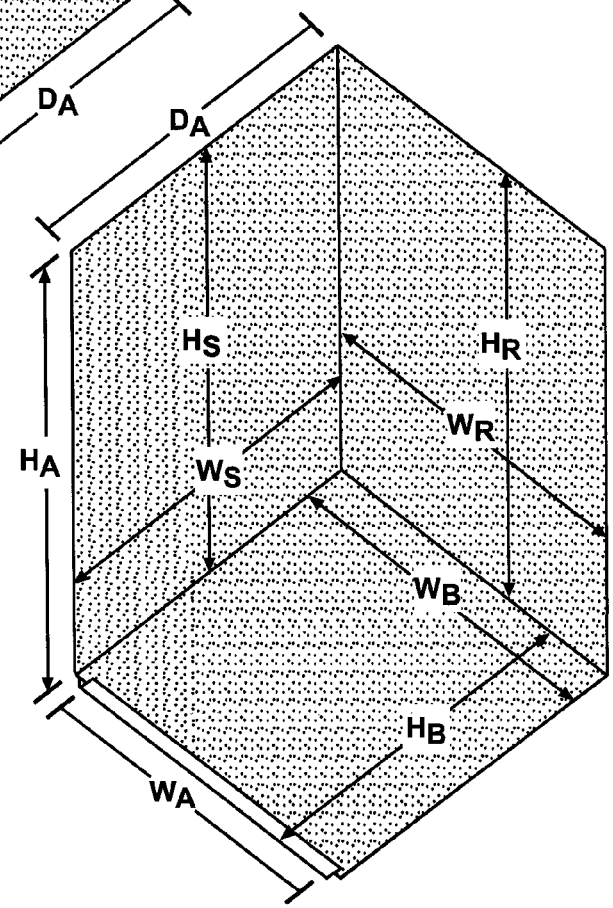
FIG. 7 is a rear perspective view of the dishwasher of FIG. 6 illustrating the polyurethane foam that is disposed about at least a portion of a bottom panel, a rear wall, and one side wall.

The instant invention provides an appliance (20) that includes a housing (22) that has an outermost surface (S), as shown in FIGS. 3-7. The appliance (20) also includes a polyurethane foam (34) disposed about at least a portion of the outermost surface (S) of the housing (22). The terminology "about a least a portion of" typically refers to the polyurethane foam (34) disposed about all parts, some parts, or less than all parts of the outermost surface (S) of the housing (22) and/or any panels, walls, or sides that are described in greater detail below.

The appliance (20) may be any known in the art including, but not limited to, dishwashers, trash compactors, clothes washing machines (wash machines), clothes drying machines (dryers), and the like. In one embodiment, the appliance (20) is selected from the group of dishwashers and clothes drying machines. Typically, the appliance (20) is further defined as a dishwasher, also shown in FIGS. 3-7. The dishwasher may be a typical "under-the-counter" dishwasher or may be classified as one of the following dishwasher types, as is recognized in the art: (a) compact; (b) countertop; (c) in-sink; (d) portable; (e) single drawer; (f) double drawer; (g) tall-tub; or (h) undersink.

The appliance (20) includes the housing (22) that has a top panel (e.g. a top side) (24), a bottom panel (26) (e.g. a bottom side), and a plurality of walls connected to the top and bottom panels (24, 26), as shown in FIGS. 3-7. The plurality of walls typically includes a front wall (28) and a rear wall (30) and at least two side walls (32). The plurality of walls define a cavity (C) in the appliance (20). The cavity is also known in the art as a tub, basin, or drum. Typically, dishes, clothes, and the like are inserted into the cavity for washing and/or drying. In one embodiment, a metal or plastic liner is disposed within the cavity.

Typically, the front wall (28) functions as a door of the appliance (20). The top panel (24), bottom panel (26), and one or more of the plurality of walls may include or be made from any material known in the art including, but not limited to, steel, stainless steel, aluminum, iron, plastics, polymers, and combinations thereof. Typically, one or more of the top panel (24), bottom panel (26), and the plurality of walls includes stainless steel. The top panel (24), bottom panel (26), and plurality of walls may be the same or different. Typically, the top panel (24), bottom panel (26), and the plurality of walls include stainless steel and/or aluminum. More typically, one or more of the top panel (24), bottom panel (26), and the plurality of walls is a stainless steel sheet. The top and bottom panels (24, 26) are typically further defined as the top and bottom panels (24, 26) of a dishwasher. The front wall (28) is typically further defined as a door of a dishwasher. The bottom panel (26) and side walls (32) are typically further defined as the bottom panel (26) and side walls (32) of a dishwasher, respectively.

The appliance (20), including the polyurethane foam (34), typically has a width ($W_A$) of from 18 to 42 inches, more typically of from 18 to 36 inches, and even more typically of from 18 to 24 inches. In one embodiment, the appliance (20) has a width ($W_A$) of about 18 inches. In another embodiment, the appliance (20) has a width ($W_A$) of about 22 inches. In still another embodiment, the appliance (20) has a width ($W_A$) of about 24 inches. The appliance (20) also typically has a height ($H_A$) of from 16 to 40 inches, more typically of from 18 to 36 inches, and even more typically from 30 to 36 inches. In one embodiment, the appliance (20) has a height ($H_A$) of from 18 to 22 inches. In another embodiment, the appliance (20) has a height ($H_A$) of from 16 to 17 inches. In still another embodiment, the appliance (20) has a height ($H_A$) of from 30 to 36 inches. The appliance (20) also typically has a depth ($D_A$) of from 18 to 24 inches. In various additional embodiments, the appliance (20) is further defined as a dishwasher and has the following dimensions:

| Type of Dishwasher | Approximate Width ($W_A$) (inches) ± 20% | Approximate Height ($H_A$) (inches) ± 20% | Approximate Depth ($D_A$) (inches) ± 20% |
|---|---|---|---|
| Traditional | 24 | 35 | 24 |
| Compact | 18 | 35 | 24 |
| Countertop | 18-22 | 18-22 | 18-22 |
| In-Sink | 36 or 42 (with sink) | 21 | 22 |
| Portable | 18 | 36-37 | 24 |
| Single Drawer | 24 | 16-17 | 24 |
| Double Drawer | 24 | 32-33 | 24 |
| Undersink | 24 | 34 | 24 |

Of course, the instant invention is not limited to these particular types of dishwashers or these particular dimensions. These types of dishwashers may have the aforementioned dimensions ($H_A$, $W_A$, $D_A$) ±5%, ±10%, ±15%, ±20%, or ±25% or may have different dimensions altogether. It is to be understood that the appliance (20) may have any height, width, and depth ($H_A$, $W_A$, $D_A$). In various embodiments, the appliance (20) has a height, width, and depth ($H_A$, $W_A$, $D_A$) that is any value or range of values within one or more of the ranges set forth above.

The height of the top and bottom panels (24, 26) ($H_T$, $H_B$) is approximately the same as the depth ($D_A$) of the appliance (20), ±½ to 3 inches, depending on a thickness of front and rear walls (28, 30). The width of the top and bottom panels (24, 26) ($W_T$, $W_B$) is approximately the same as the width of the appliance (20) ±½ to 3 inches, also depending on a thickness of the side walls (32) and the polyurethane foam (34). The thickness of the top and bottom panels (24, 26) is not particularly limited and may be selected by one of skill in the art.

The front and rear walls (28, 30) also have approximately the same height ($H_F$, $H_R$) as the appliance (20) ±½ to 3 inches, depending on a thickness of the top and bottom panels (24, 26). The width of the front and rear walls (28, 30) ($W_F$, $W_R$) is also approximately the same as the width of the appliance (20), ±½ to 3 inches, depending on a thickness of the side walls (32) and the polyurethane foam (34). The thickness of the front and rear walls (28, 30) is not particularly limited and may be selected by one of skill in the art.

The side walls (32) also have approximately the same height ($H_S$) as the appliance (20) ½ to 3 inches, depending on a thickness of the top and bottom panels (24, 26) and the polyurethane foam (34). The width of the side walls (32) ($W_S$) is also approximately the same as the depth of the appliance (20) ($D_A$), ±½ to 3 inches, depending on a thickness of the front and rear walls (28, 30) and the polyurethane foam (34). The thickness of the side walls (32) is not particularly limited and may be selected by one of skill in the art. Typically, the front wall (28), rear wall (30), top panel (24), bottom panel (26), and side walls (32) have a thickness of from 1/16 to 6 inches. Even more typically, the rear wall (30), top panel (24), bottom panel (26), and side walls (32) have a thickness of from 1/16 to 3, of from 1/16 to 1, of from 1/16 to ¾, of from 1/16 to ½, or from 1/16 to 1/8, inches. The front wall (28) is typically thicker than the rear wall (30), top panel (24), bottom panel (26), and side walls (32) when the appliance (20) is further defined as a dishwasher. As is known in the art, the front wall (28) may include electronics.

One or more of the front wall (28), rear wall (30), top panel (24), bottom panel (26), and plurality of walls may be a single layer, may include two layers, or may be further defined as a composite of three or more layers. These layers may include any material known in the art, but typically include steel, stainless steel, aluminum, iron, plastics, polymers, and/or combinations thereof. Typically, the front wall (28) includes a plurality of layers and may include an air gap of about 1 inch to allow for placement and function of electronics, such as electronic circuit boards. More typically, the top panel (24), bottom panel (26), and plurality of walls include a single sheet metal layer. However, it is also contemplated that an additional metal layer, polymer layer, or plastic layer may be disposed on one more of the top panel (24), bottom panel (26), and/or plurality of walls.

Referring back to the housing (22), the top and bottom panels (24, 26) are typically substantially parallel to each other. The front and rear walls (28, 30) and the side walls (32) are also typically substantially parallel to each other, respectively. The front wall (28), rear wall (30), and side walls (32) are each disposed between the top and bottom panels (24, 26). The top and bottom panels (24, 26) are connected to the plurality of walls at one or more points. For example, the top panel (24) is typically connected to the front wall (28) when the front wall (28) is disposed approximately parallel to the rear wall (30), e.g. when the front of the dishwasher or clothes dryer is a door and the door is closed.

As first introduced above, the appliance (20) also includes the polyurethane foam (34) disposed about at least a portion of the outermost surface (S) of the housing (22). The polyurethane foam (34) may partially or completely cover the outermost surface (S) of the housing (22). In one embodiment, the polyurethane foam (34) is disposed in one or more portions or strips about the outermost surface (S) such that the polyurethane foam (34) does not completely cover the outermost surface (S). It is also contemplated that the polyurethane foam (34) may be disposed in sections or portions smaller in size than the outermost surface (S). In one embodiment, the polyurethane foam (34) is disposed about at least a portion of the outermost surface (S) in a location that is approximately the same as a location of a motor or other component of the appliance (20). In another embodiment, the polyurethane foam (34) is disposed about at least a portion of the top panel (24), bottom panel (26), the side walls (32) and the rear wall (30). In still another embodiment, the polyurethane foam (34) is disposed about at least a portion of the top panel (24), the side walls (32), and the rear wall (30). In a further embodiment, the plurality of walls is further defined as four walls and the polyurethane foam (34) is disposed about at least a portion of the top panel (24) and at least three of the four walls. Typically, the polyurethane foam (34) is not disposed about at least a portion of the front wall (28) when the appliance (20) is a dishwasher. In one embodiment, the polyurethane foam (34) is disposed about a total of five sides/walls of the appliance (20).

The polyurethane foam (34) may be formed by any method in the art and may be disposed about at least a portion of the outermost surface (S) via spraying, using adhesive, through lamination, or in conjunction with reaction injection molding. The polyurethane foam (34) may also be disposed about at least a portion of the outermost surface (S) before, during, or after construction of the appliance (20). In one embodiment, sheets of metal that are used to form one or more of the top and bottom panels (24, 26), front and rear walls (28, 30), and/or plurality of side walls (32) is coated with the polyurethane foam (34) before the appliance (20) is constructed. In another embodiment, the polyurethane foam (34) is applied to the outermost surface (S) at the same time as one or more of the top and bottom panels (24, 26), front and rear walls (28, 30), and/or plurality of side walls (32) is being assembled to form the appliance (20). Alternatively, the polyurethane foam (34) may be applied to the outermost surface (S) after the appliance (20) is constructed.

The polyurethane foam (34) has a density of from 10 to 90 pounds per cubic foot (pcf) as determined according to ASTM D 1622. More typically, the polyurethane foam (34) has a density of from 20 to 60, of from 20 to 50, or from 25 to 40, pounds per cubic foot as determined according to ASTM D 1622. Without intending to be bound by any particular theory, it is believed that the density of the polyurethane foam (34) contributes to an energy-favorable thermal mass such that a decreased amount of energy is required to operate the appliance (20). In other words, the density of the polyurethane foam (34) allows it to be an excellent insulator. At the same time, the density of the polyurethane foam (34) also contributes to sound and vibration reduction from the appliance (20).

The polyurethane foam (34) also has a damping factor of at least 0.2 measured at a temperature of from 40° C. to 60° C. as determined according to ASTM D 4065. The polyurethane foam (34) is typically a semi-rigid foam, as illustrated by the damping factor. In one embodiment, the polyurethane foam (34) has "memory" properties.

The damping factor is a measurement of an amount of damping in an oscillatory system. In this case, the polyurethane foam (34) is measured using dynamic mechanical analysis (DMA) to determine modulus versus temperature. As is known in the art, stiffness and the damping factor are also determined based on the modulus and temperature. The damping factor is typically calculated as tan-delta (tan δ). The peak tan delta of the instant polyurethane foam (34) can be as low as 0.2, measured at a temperature of from 40° C. to 60° C. as determined according to ASTM D 4065. There is no particular upper limited on the damping factor. In various embodiments, the polyurethane has a damping factor of from 0.2 to 2, of from 0.5 to 1.5, or from 1 to 1.5, measured at a temperature of from 40° C. to 60° C. determined using ASTM D 4065.

The damping properties of the polyurethane foam (34) can also be evaluated through generation of vibration in the polyurethane foam (34) and subsequent damping. This type of evaluation of damping is typically referred to in the art as a structural resonance testing and measures decibels (db) produced as a function of frequency across a spectrum of 0 to 500 Hz. Typically, the structural resonance test is qualitative. As set forth in Table 7 below, one embodiment of the instant invention produces decibels between 0 and 75 across the spectrum of 0 to 500 Hz in a structural resonance test.

The polyurethane foam (34) typically reduces the noise and vibration of the appliance (20), when running in a standard washing mode, to a decibel level (db) of less than 35, less than 30, or less than 25, db, across an acoustic spectrum of from 100 to 10,000 Hz, and more specifically at any one or more of the following frequencies: 100, 125, 160, 200, 250, 315, 400, 500, 630, 800, 1000, 1250, 1600, 2000, 2500, 3150, 4000, 5000, 6300, 8000, or 10000, Hz, according to IEC 60704-2-3. In various embodiments, the noise and vibration of the appliance (20) when running in a standard washing mode is less than 25 db at frequencies of from 100 to 1000 Hz and less than 20 db at frequencies of from 1250 to 10000 Hz. Without intending to be bound by any particular theory, it is believed that the IEC 60704-2-3 test accounts for water splash in a dishwasher (>1000 Hz) and sounds produced by a dishwasher motor (<1000 Hz) in the standard washing mode.

The polyurethane foam (34) also typically reduces the noise and vibration of the appliance (20), when running in a standard draining mode, to a decibel level (db) generally less than 50, and more typically less than 45, 40, and 30, db, across an acoustic spectrum of from 100 to 10,000 Hz, and more specifically at any one or more of the following frequencies: 100, 125, 160, 200, 250, 315, 400, 500, 630, 800, 1000, 1250, 1600, 2000, 2500, 3150, 4000, 5000, 6300, 8000, or 10000, Hz, according to IEC 60704-2-3. In various embodiments, the noise and vibration of the appliance (20) when running in the standard draining mode is less than 30 db at frequencies of from 100 to 1000 Hz and at frequencies of from 1250 to 10000 Hz. Without intending to be bound by any particular theory, it is believed that the IEC 60704-2-3 test accounts for water splash in a dishwasher (>1000 Hz) and sounds produced by a dishwasher motor (<1000 Hz) in the standard draining mode.

The polyurethane foam (34) also typically has a K-factor of less than 5.0, less than 4.0, less than 3.0, or less than 2.0, btu-in/hr-ft$^2$-° F. as determined according to ASTM C 518. As is known in the art, heat is measured in British Thermal Units (BTUs). One BTU is the amount of heat needed to raise the temperature of one pound of water by one degree Fahrenheit. Thermal conductivity (k-factor) is a measure of the ability of the polyurethane foam (34) to transfer heat. The K-factor is based on a number of BTUs per hour that pass through a one inch (1") thick by one foot (1') square section of the polyurethane foam (34) with a 1° F. temperature difference between surfaces. Accordingly, decreased K-factor values indicate increased insulative properties of the polyurethane foam (34). Typically, the polyurethane foam (34) has a K-factor of from 0.1 to 2, from 0.2 to 1, or from 0.6 to 1, btu-in/hr-ft$^2$-° F. as determined according to ASTM C 518.

The polyurethane foam (34) also has an R-value that is related to the K-factor. The R-value is not particularly limited but typically is a measure of an ability of the polyurethane foam (34) to retard heat flow rather than to transmit heat. Increased R-values indicate increased insulative properties of the polyurethane foam (34). The R-value of the polyurethane foam (34) is typically related to the K-factor according to the following equation: R-value=Thickness of the Polyurethane foam (34) (inches)/K-factor (btu-in/hr-ft$^2$-° F.). The polyurethane foam (34) of this invention typically has an R-value of from 0.3 to 5.0, from 0.5 to 2.5, or from 0.8 to 2.5 at a 0.5 inch thickness when disposed on the outermost surface (S) of the housing (22).

The polyurethane foam (34) has a glass transition temperature ($T_g$) that may be at least 10° C. as determined according to DMA and ASTM D 4065, as described above. In one embodiment, the polyurethane foam (34) has a glass transition temperature of from 10° C. to 65° C. determined using DMA and ASTM D 4065. In another embodiment, the polyurethane foam (34) has a glass transition temperature of from 25° C. to 35° C. determined using DMA and ASTM D 4065. In still other embodiments, the polyurethane foam (34) has a glass transition temperature of from 10° C. to 60° C., from 20° C. to 60° C., from 30° C. to 60° C., from 40° C. to 60° C., or from 50° C. to 60° C., determined using DMA and ASTM D 4065. Without intending to be bound by any particular theory, it is believed that a peak level of damping coincides with a glass transition temperature, typically of from 40° C. to 60° C. For example, when an appliance (20) and a polyurethane foam (34) disposed about at least a portion of the outer surface and having a $T_g$ of from 40° C. to 60° C. is heated to a temperature of 40° C. to 60° C., maximum damping is believed to occur in this temperature range. It is contemplated that the polyurethane foam (34) may have any glass transition temperature or range of glass transition temperatures within the aforementioned ranges.

The polyurethane foam (34) disposed about at least a portion of the outermost surface (S) may be of any thickness. Typically, the thickness is determined based on application needs. In various embodiments, the polyurethane foam (34) has a thickness of from 1/16 to 6, from 1/16 to 3, from 1/16 to 1, from 1/16 to 3/4, from 1/8 to 3/4, or from 1/2 to 3/4, inches. It is contemplated that the polyurethane foam (34) may have any thickness or range of thicknesses within the aforementioned ranges.

The polyurethane foam (34) includes a reaction product of an isocyanate composition and a resin composition. Said differently, the polyurethane foam is typically formed from the reaction product of the resin composition and the isocyanate composition. The resin composition includes at least one polyol, i.e., one or more polyols, each of which may be independently further defined as a polyether polyol, a polyester polyol, or combinations thereof. Even more typically, each of the one or more polyols is further defined as a polyether polyol. The one or more polyols are each typically formed from a reaction of an initiator and an alkylene oxide. It is also contemplated that the resin composition may also include one or more polyamines.

Typically, the initiator is selected from the group of aliphatic initiators, aromatic initiators, and combinations thereof. In one embodiment, the initiator is selected from the group of ethylene glycol, propylene glycol, dipropylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, sorbitol, aniline, o-chloroaniline, p-aminoaniline, 1,5-diaminonaphthalene, methylene dianiline, the condensation products of aniline and formaldehyde, 2,3-, 2,6-, 3,4-, 2,5-, and 2,4-diaminotoluene and isomeric mixtures, methylamine, triisopropanolamine, ethylenediamine, 1,3-diaminopropane, 1,3-diaminobutane, 1,4-diaminobutane, and combinations thereof. In another embodiment, the initiator is selected from the group of glycerol, 1,1,1-trimethylolpropane, and combinations thereof. However, it is contemplated that any suitable initiator known in the art may be used in the present invention.

Typically, the alkylene oxide that reacts with the initiator is selected from the group of ethylene oxide, propylene oxide, butylene oxide, amylene oxide, tetrahydrofuran, alkylene oxide-tetrahydrofuran mixtures, epihalohydrins, aralkylene oxides, and combinations thereof. In one embodiment, the alkylene oxide is selected from the group of ethylene oxide, propylene oxide, and combinations thereof. In another embodiment, the alkylene oxide includes ethylene oxide. However, it is also contemplated that any suitable alkylene oxide that is known in the art may be used in the present invention.

The resin composition may include a single polyol, two polyols, or multiple polyols, as described above. In one embodiment, the resin composition includes two polyols. In another embodiment, the resin composition includes three polyols. Typically, the resin composition includes a first polyol that has a number average molecular weight of from 400 to 700 g/mol. More typically, the first polyol is a triol. Even more typically, the first polyol is a triol that has a number average molecular weight of about 700 g/mol. The resin composition may also include a second polyol that has a number average weight of about 400 g/mol. More typically, the second polyol is a diol. Even more typically, the second polyol is a diol that has a number average molecular weight of about 400 g/mol. The resin composition may also include a third polyol that has a number average molecular weight of from 1,500 to 10,000 g/mol. More typically, the third polyol is a triol. Even more typically, the third polyol is a triol that has a number average molecular weight of from 4,000 to 6,000 g/mol or of about 5,000 g/mol.

In one embodiment, the resin composition includes three polyols as set forth immediately below:

|  | Polyol 1 | Polyol 2 | Polyol 3 |
| --- | --- | --- | --- |
| Approximate Hydroxyl Number (mg KOH/gm) | 388-408 | 222-237 | 260 |
| Nominal Functionality | 3 | 3 | 2 |
| Number Average Molecular Weight | 400 | 700 | 425 |

Typically, the one or more polyols have a hydroxyl number of from 10 to 500 mg KOH/g. The one or more polyols also typically have a nominal functionality of from 1 to 8, and more typically of from 2 to 4. Even more typically, one or more of the polyols has a nominal functionality of 2 or 3. Still further, the one or more polyols may also include an organic functional group selected from the group of a carboxyl group, an amine group, a carbamate group, an amide group, and an epoxy group. Typical polyetherols that can be used in the present invention include those commercially available from BASF Corp. of Wyandotte, Mich., such as Pluracol® GP 430, Pluracol® GP730, Pluracol® P410, and combinations thereof.

In various embodiments, the resin composition includes the first polyol present in an amount of from 25 to 95, from 35 to 75, from 40 to 60, or from 45 to 55, parts by weight per 100 parts by weight the resin composition. In other embodiments, the resin composition includes the second polyol in an amount of less than 70, from 5 to 70, from 10 to 60, from 40 to 60, or from 45 to 55, parts by weight per 100 parts by weight the resin composition.

In still other embodiments, the polyurethane foam (34) includes the first polyol, after reaction with the isocyanate composition, present in an amount 10 to 50, from 20 to 40, from 20 to 30, or from 22 to 28, parts by weight per 100 parts by weight of the polyurethane. The polyurethane foam (34) may also include the second polyol, after reaction with the isocyanate composition, present in an amount of less than 35, from 2 to 35, from 5 to 30, from 20 to 30, or from 22 to 28, parts by weight per 100 parts by weight of the polyurethane. Even further, the polyurethane may include the third polyol, reaction with the isocyanate composition, present in an amount of from 5 to 50, from 10 to 30, or from 10 to 20, parts by weight per 100 parts by weight of the polyurethane. It is contemplated that the first and second polyols may be present in any amount or any range of amounts within the aforementioned ranges.

Referring now to the isocyanate composition first introduced above, the isocyanate composition may include an aromatic isocyanate, an aliphatic isocyanate, and combinations thereof. In one embodiment, the isocyanate composition includes an aromatic isocyanate. If the isocyanate composition includes an aromatic isocyanate, the aromatic isocyanate preferably corresponds to the formula R'(NCO)$_z$ wherein R' is a polyvalent organic radical which is aromatic and z is an integer that corresponds to the valence of R'. Preferably, z is at least two.

The isocyanate composition may include a prepolymer and/or a modified multivalent isocyanate, i.e., a product which is obtained through chemical reactions of aromatic diisocyanates and/or aromatic polyisocyanates. In one embodiment, the isocyanate composition includes a prepolymer of the third polyol described above reacted with 4,4'-diphenylmethane diisocyanate. In various other embodiments, 5, 10, 15, 20, 25, 30, 35, 40, 45, or 50 parts by weight of the third polyol are reacted with the 4,4'-diphenylmethane diisocyanate to form the prepolymer. In still another embodiment, the isocyanate composition includes a uretonimine modified 4,4'-diphenylmethane diisocyanate.

Non-limiting examples of components that can be included in the isocyanate composition are polyisocyanates including, but not limited to, esters, ureas, biurets, allophanates, carbodiimides, uretonimines, and isocyanurate and/or urethane groups including diisocyanates and/or polyisocyanates. In one embodiment, the isocyanate composition includes an isocyanate selected from the group of modified benzene and toluene diisocyanates employed individually or in mixtures as di- and/or polyoxyalkyleneglycols, diethylene glycols, dipropylene glycols, polyoxyethylene glycols, polyoxypropylene glycols, polyoxypropylenepolyoxethylene glycols, and combinations thereof. In another embodiment, the isocyanate composition includes an isocyanate is selected from the group of 4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitrobenzene, 2,5-diisocyanato-1-nitrobenzene, m-phenylene diisocyanate, p-phenylene diisocyanate, 2,4-toluene diisocyanate, 2,6-toluene diisocyanate, mixtures of 2,4- and 2,6-toluene diisocyanate, 1,5-naphthalene diisocyanate, 1-methoxy-2,4-phenylene diisocyanate, 4,4'-diphenylmethane diisocyanate, 2,4'-diphenylmethane diisocyanate, 4,4'-biphenylene diisocyanate, 3,3'-dimethyl-4,4'-diphenylmethane diisocyanate, and 3,3'-dimethyldiphenylmethane-4,4'-diisocyanate, triisocyanates such as 4,4',4"-triphenylmethane triisocyanate polymethylene polyphenylene polyisocyanate and 2,4,6-toluene triisocyanate, tetraisocyanates such as 4,4'-dimethyl-2,2'-5,5'-diphenylmethane tetraisocyanate, toluene diisocyanate, 2,4'-diphenylmethane diisocyanate, 4,4'-diphenylmethane diisocyanate, polymethylene polyphenylene polyisocyanate, and combinations thereof. In still another embodiment, the isocyanate composition includes an isocyanate that is selected from the group of 4,4'-, 2,4'- and 2,2'-diphenylmethanediisocyanates, 2,4- and 2,6-toluene diisocyanates, corresponding isomeric mixtures of 4,4'-, 2,4'- and 2,2'-diphenylmethanediisocyanate, corresponding isomeric mixtures of 4,4'- and 2,4'-diphenylmethanediisocyanates, and combinations thereof. Typically, an amount of polymeric MDI is reduced to less than or equal to about 30% by weight of the isocyanate composition. In one embodiment, the isocyanate is selected from the group of 2,4' -diphenylmethane diisocyanate, 4,4' -diphenylmethane diisocyanate, and combinations thereof. A typical example of 2,4'-diphenylmethane diisocyanate is commercially available from BASF Corporation of Wyandotte, Mich., under the trade name of Lupranate® MP102. A typical example of 4,4'-diphenylmethane diisocyanate is commercially available from BASF Corporation of Wyandotte, Mich., under the trade name of Lupranate® MM103.

The isocyanate composition may have any % NCO content and any viscosity. The isocyanate composition may also react with the resin composition in any amount, as determined by one skilled in the art. Preferably, the isocyanate composition and the resin composition are reacted at an isocyanate index from 70 to 150, more preferably from 80 to 105, and even more preferably from 85 to 95.

In one embodiment, the polyurethane foam (34) includes the reaction product of the resin composition and the isocyanate composition, wherein the resin composition includes a diol and a triol, each having a number average molecular weight of less than 1,000 g/mol, and wherein the isocyanate composition includes an isocyanate prepolymer. In a similar embodiment, the isocyanate composition includes less than 30 percent by weight of polymeric methylene diphenyl diisocyanate.

The resin composition and/or isocyanate composition may also include an additive selected from the group of chain extenders, anti-foaming agents, processing additives, plasticizers, chain terminators, surface-active agents, adhesion promoters, flame retardants, anti-oxidants, water scavengers, fumed silicas, dyes, ultraviolet light stabilizers, fillers, thixotropic agents, silicones, amines, transition metals, catalysts, blowing agents, surfactants, cross-linkers, inert diluents, chain extenders, flame retardants, and combinations thereof. The additive may be included in any amount as desired by those of skill in the art.

The resin composition may also include one or more polymerization catalysts. If so, the polymerization catalyst may include an amine. If the polymerization catalyst includes an amine, the amine typically includes, but is not limited to, dimethylethanolamine, triethylenediamine, N-methylmorpholine, N-ethylmorpholine, diethylethanolamine, N-cocomorpholine, 1-methyl-4-dimethylaminoethylpiperizine, 3-methoxypropyldimethylamine, N,N,N'-trimethylisopropyl propylenediamine, 3-diethylaminopropyldiethylamine, dimethylbenzylamine, ethylhexanoic acid blocked 1,8-Diazabicyclo[5.4.0]undec-7-ene, and combinations thereof. The polymerization catalyst may be further defined as a metal catalyst such as a tin catalyst, e.g. dimethyltin mercaptide. The polymerization catalyst may be present in the resin composition in any amount. In various embodiments, the polymerization catalyst is present in the resin composition in an amount of less than or equal to 10, or in amounts of from 1 to 8, from 1 to 7, from 1 to 6, from 1 to 5, from 1 to 4, from 1 to 3, or from 1 to 2, parts by weight per 100 parts by weight of the resin composition. It is to be understood that the polymerization catalyst is not limited to the aforementioned amounts and may be present in amounts within one or more of the above ranges. Without intending to be bound by any particular theory, it is believed that the amount of polymerization catalyst utilizes affects a gel-time of the polyurethane foam (34). In various embodiments, the polyurethane foam (34) has a gel time of less than 60, less than 50, less than 40, less than 30, or less than 20, seconds.

Referring back to the appliance (20), the appliance (20) may also include an outermost layer (36) disposed about at least a portion of the polyurethane foam (34) sandwiching the polyurethane foam (34) between the outermost layer (36) and the outermost surface (S) of the housing (22). The outermost layer (36) may partially or completely cover the polyurethane foam (34). In one embodiment, the outermost layer (36) is disposed in one or more portions or strips about the polyurethane foam (34) such that the outermost layer (36) does not completely cover the polyurethane foam (34). In one embodiment, the outermost layer (36) is disposed about at least a portion of the polyurethane foam (34) on the top panel (24), the bottom panel (26), the side walls (32) and the rear wall (30). In another embodiment, the outermost layer (36) is disposed about at least a portion of the polyurethane foam (34) on the top panel (24), the side walls (32), and the rear wall (30). In still another embodiment, the plurality of walls is further defined as four walls and the outermost layer (36) is disposed about at least a portion of the polyurethane foam (34) on the top panel (24) and at least three of the four walls. Typically, the outermost layer (36) is not disposed about the front wall (28) when the appliance (20) is a dishwasher. In one embodiment, the outermost layer (36) is disposed about a total of five sides/walls of the appliance (20).

The outermost layer (36) typically has a density that is greater than a density of the polyurethane foam (34). In various embodiments, the density of the outermost layer (36) is at least 10%, 15%, 20%, 25%, 30%, 35%, 40%, 45%, 50%, 55%, or 60% greater than the density of the polyurethane foam (34). In other embodiments, the density of the outermost layer (36) is from 50 to 60, 50 to 70, 50 to 80, 50 to 90, or 50 to 100, pounds per cubic foot (pcf). It is also contemplated that the density of the outermost layer (36) may fall within one or more ranges of the aforementioned values. In one embodiment, the density of the outermost layer (36) is increased through use of fillers including, but not limited to, barium sulfate, calcium carbonate, minerals, and combinations thereof. The outermost layer (36) is typically elastomeric but can be a foam. In an alternative embodiment, the outermost layer (36) is an asphalt mastic, as is well known in the art. Without intending to be limited by any particular theory, it is believed that use of the outermost layer (36) having a density higher than that of the polyurethane foam (34) increases the overall mass of the combination of the polyurethane foam (34) and the outermost layer (36) and increases reduction of noise and vibrations. In addition, the outermost layer (36) can be positioned to maximize energy efficiency of the appliance (20).

The outermost layer (36) may be of any thickness. Typically, the thickness is determined based on application needs. In various embodiments, the outermost layer (36) has a thickness of from 1/16 to 6, from 1/16 to 3, from 1/16 to 1, from 1/16 to 3/4, or from 1/8 to 1/4 inches. It is contemplated that the outermost layer (36) may have any thickness or range of thicknesses within the aforementioned ranges.

In various embodiments, the outermost layer (36) includes a polyurethane elastomer, a polyurea elastomer, a polyurethane-polyurea copolymer (e.g. a polyurethane-polyurea hybrid elastomer), or a combination thereof. In one embodiment, the outermost layer (36) includes a polyurethane elastomer. In another embodiment, the outermost layer (36)

includes a polyurea elastomer. In still another embodiment, the outermost layer (36) includes a polyurethane-polyurea hybrid elastomer. In yet another embodiment, the outermost layer (36) includes an asphalt mastic elastomer.

The instant invention also provides a method of forming the appliance (20). The method includes the step of applying the polyurethane foam (34) about the outermost surface (S) of the appliance (20). In one embodiment, the housing (22) has the top panel (24) and the bottom panel (26) that are disposed opposite each other and also has the plurality of walls connected to the top and bottom panel (26). In this embodiment, the step of applying the polyurethane foam (34) may be further defined as applying the polyurethane foam (34) to at least one of the top panel (24), bottom panel (26), and plurality of walls before the top panel (24) and bottom panel (26) are connected by the plurality of walls. More specifically, the polyurethane foam (34) may be applied to each of the top and bottom panels (24, 26) and the plurality of walls but not the bottom. Conversely, the step of applying the polyurethane foam (34) may be further defined as applying the polyurethane foam (34) to at least one of the top panel (24), bottom panel (26), and plurality of walls after the top panel (24) and bottom panel (26) are connected by the plurality of walls. The method may also include the step of applying the outermost layer (36) on the polyurethane foam (34) sandwiching the polyurethane foam (34) between the outermost layer (36) and the outermost surface (S) of the housing (22).

The steps used to assemble or construct the appliance (20) relative to aligning and connecting the top and bottom panels (24, 26), the front and rear walls (28, 30), and the plurality of walls, is not particularly limited. In other words, the steps of forming the appliance (20) may be any known in the art. In one embodiment, the polyurethane foam (34) is disposed about at least a portion of the outermost surface (S) via spraying. The step of spraying may be further defined as spraying a reaction mixture of the resin composition and the isocyanate composition using an impingement mixer. In this embodiment, the polyurethane foam (34) forms on the outermost surface (S).

In various embodiments, the polyurethane foam (34) can be disposed by spraying the reaction mixture using a device such as a commercial high pressure proportioning unit (e.g. a Gusmer H-20/35 or Glascraft Model MH-22300 01), using a spray gun such as a Glascraft Probler 2, using a 00 mix chamber, and/or using a 01 cone tip plus 36/40 fan tip (~0.036 in. diameter, ~40° fan angle). Typically, the polyurethane foam (34) is disposed by spraying the resin composition and the isocyanate composition at pressures of from 1500 to 2000, from 1600 to 1900, from 1700 to 1900, or at about 1800, psi. Typically the resin composition and/or the isocyanate composition are independently heated to temperatures of from 120 to 170, from, 130 to 160, from 140 to 150, or to a temperature of about 150° F. Hose temperatures may also fall within this temperature range. Hydraulic pressures of from 400 to 800, from 500 to 700, or of about 600, psi may also be utilized. In one embodiment, the outermost surface (S) is sprayed at ambient temperature. However, it is also contemplated that the outermost surface (S) may be heated or cooled.

Alternatively, the step of applying may be further defined as adhering the polyurethane foam (34) to the outermost surface (S) wherein the polyurethane foam (34) is formed apart from the outermost surface (S) and later applied to the surface (S). Still further, the step of applying may be further defined as laminating. Said differently, the polyurethane foam (34) may be applied to the outermost surface (S) of various components of the appliance (20) before construction of the appliance. Subsequent to application or lamination, the various components may then be constructed to form the appliance (20) having the polyurethane foam (34) already formed thereon. It is also contemplated that the step of applying may be used in conjunction with reaction injection molding.

EXAMPLES

Three polyurethane foams (Foams 1-3) are formed according to the instant invention. A comparative asphalt mastic (Mastic 1) is also prepared along with a comparative foam (Comparative Foam 1). The Foams 1-3 and the Comparative Foam 1 are formulated according to the formulas set forth in Table 1 below wherein all parts are in grams unless otherwise noted. More specifically, the Foams 1-3 each include the reaction product of a resin composition and an isocyanate composition. After formation, the Foams 1-3, the Comparative Foam 1, and the Mastic 1 are evaluated to determine a variety of physical properties.

TABLE 1

| | Foam 1 | Foam 2 | Foam 3 | Comparative Foam 1 | Mastic 1 |
|---|---|---|---|---|---|
| Resin Composition | | | | | |
| Polyol 1 | 46 | — | — | — | — |
| Polyol 2 | — | 56 | — | — | — |
| Polyol 3 | 50 | 30 | — | — | — |
| Polyol 4 | — | — | 30.23 | 30.23 | — |
| Polyol 5 | — | — | 25 | 25 | — |
| Polyol 6 | — | — | 6 | 6 | — |
| Chain Extender 1 | — | 10 | — | — | — |
| Catalyst 1 | 2 | 2 | 2 | 2 | — |
| Catalyst 2 | 1 | 1 | 3 | 3 | — |
| Catalyst 3 | 2 | 2 | 2 | 2 | — |
| Catalyst 4 | 0.2 | 0.2 | 0.2 | 0.2 | — |
| Surfactant 1 | 0.5 | 0.5 | 0.5 | 0.5 | — |
| Surfactant 2 | — | — | 10 | 10 | — |
| Flame Retardant | — | — | 6 | 6 | — |
| Plasticizer | — | — | 5 | 5 | — |
| Water | 0.07 | 0.07 | 0.07 | 0.07 | — |
| Total | 101.7 | 101.7 | 90.0 | 90.0 | — |
| Isocyanate composition | | | | | |
| Isocyanate 1 | 100.0 | 100.0 | 100.0 | 50 | — |
| Volume Ratio (Resin:Isocyanate) | 100.0 | 100.0 | 100.0 | — | — |
| pbw Isocyanate 1 | 115.9 | 115.9 | 86 | — | — |
| Isocyanate 2 | — | — | — | 50 | — |
| Volume Ratio (Resin:Isocyanate) | — | — | — | 100.0 | — |
| pbw Isocyanate 2 | — | — | — | 86 | — |
| Isocyanate Index | 88.6 | 94.7 | 90 | 139 | — |
| Physical Properties | | | | | |
| Density (pcf) | 25.1 | 38.1 | ~31.2 | ~31.2 | ~100+ |
| k-factor (btu-in/hr-ft$^2$-° F.) | 0.60 | 0.92 | 0.66 | 0.544 | 5.18 |
| Thickness - k-factor sample (mm) | 4.5 | 4.7 | 4.0 | 0.154 | 3.7 |
| DMA Properties | | | | | |
| $T_g$ (° C.) | 35.6 | 30.9 | 50.2 | 85.5 | — |
| Peak Tan Delta | 1.03 | 1.37 | 0.67 | 0.61 | — |

Polyol 1 is a trifunctional polyol having a hydroxyl number of approximately 398 mg KOH/g and a number average molecular weight of about 400 g/mol.

Polyol 2 is also a trifunctional polyol having a hydroxyl number of approximately 230 mg KOH/g and a number average molecular weigh of about 700 g/mol.

Polyol 3 is a polypropylene glycol having a hydroxyl number of approximately 260 mg KOH/g and a number average molecular weight of about 400 g/mol.

Polyol 4 is a sucrose and glycerine initiated polypropylene polyol having an average functionality of about 5.6 and a hydroxyl number of about 470 mg KOH/g and a number average molecular weight of about 670 g/mol.

Polyol 5 is a sucrose and glycerine initiated polypropylene polyol having an average functionality of about 4.5 and a hydroxyl number of about 360 mg KOH/g and a number average molecular weight of about 700 g/mol.

Polyol 6 is an ethylenediamine initiated polyol having a hydroxyl number of about 800 mg KOH/g and a number average molecular weight of about 280 g/mol.

Chain Extender 1 is a dipropylene glycol having a hydroxyl number of approximately 840.

Catalyst 1 is a trimerization catalyst commercially available under the trade name of Polycat® 43.

Catalyst 2 is dimethylethanolamine.

Catalyst 3 is a gelation catalyst commercially available under the trade name of Dabco® 33-LV.

Catalyst 4 is a dimethyltin mercaptide commercially available under the trade name of Fomrez® UL-28.

Surfactant 1 is a silicone surfactant commercially available under the trade name of Tegostab® B8404.

Surfactant 2 is a nonylphenol ethoxylate having 10 moles of ethylene oxide for every one mole of nonylphenol.

Plasticizer is propylene carbonate.

Flame Retardant is TCPP (tris(1-chloroisopropyl)phosphate).

Isocyanate 1 is a prepolymer of 70% by weight of a uretonimine-modified 4,4'-MDI and 30% by weight of a glycerin initiated polyol having 84% by weight of polypropylene units, a 16% ethylene oxide cap, and a hydroxyl number of about 35 mg KOH/g.

Isocyanate 2 is a polymeric MDI with a functionality of approximately 2.7.

Density is determined using ASTM D 1622.

K-factor is determined according to ASTM C518-04 using a FOX50 Heat Flow Meter instrument (LaserComp, Inc.) and a single thickness method. A mean temperature of 43° C. and a temperature difference of 20° C. are used. Samples are disk shaped, 50 mm in diameter, and 4 mm±1 mm thick.

DMA is determined according to ASTM D 4065. Samples of dimensions 25 mm×12 mm×12 mm are tested using TA Instruments RSA 3 in a 3-point bend mode with frequency=1 Hz, strain=0.05%, and temperature ramp rate of 5° C./min from −100 to 100° C.

Figure 8:
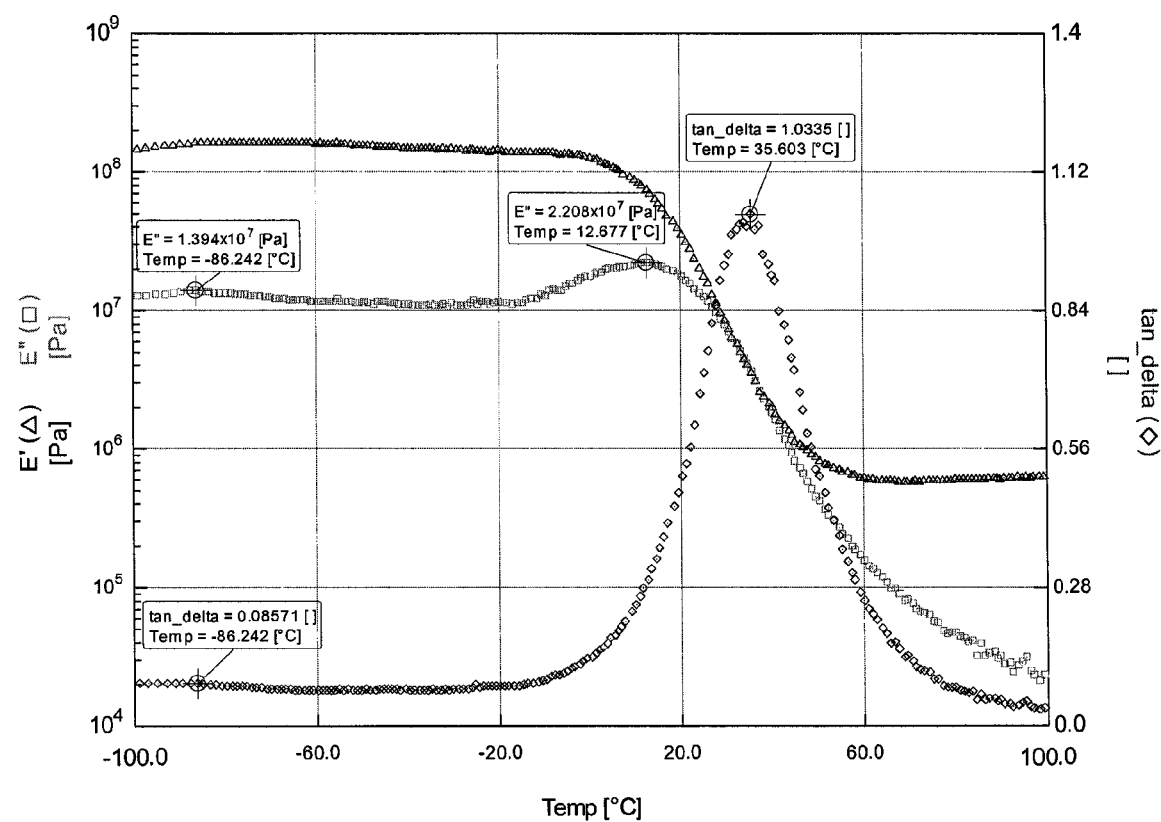
FIG. 8 is graph that illustrates E' (storage modulus), E" (loss modulus), tan delta (E'/E"), and $T_m$ (melt temperature) of Foam 1 of the Examples.
Figure 9:
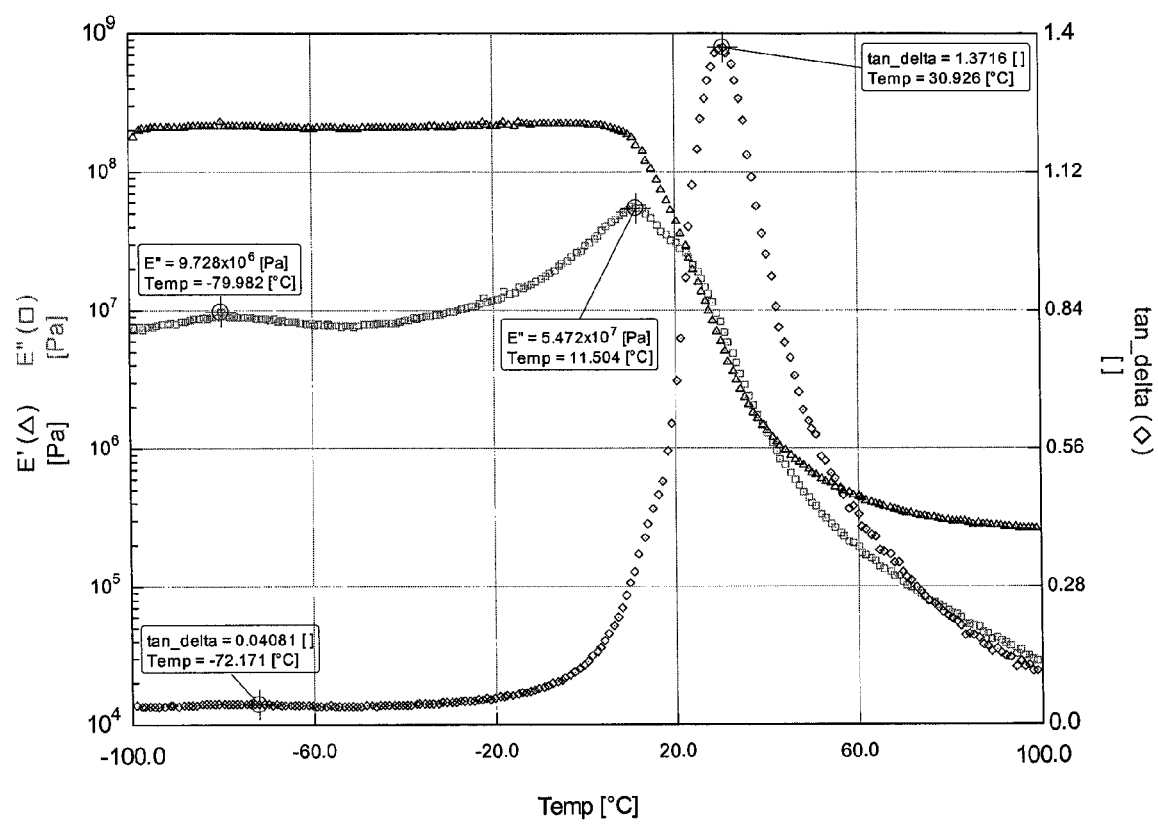
FIG. 9 is graph that illustrates E' (storage modulus), E" (loss modulus), tan delta (E'/E"), and $T_m$ (melt temperature) of Foam 2 of the Examples.

DMA results are also set forth in FIGS. 8 and 9 representing Foams 1 and 2, respectively. These Figures illustrate E' (storage modulus), E" (loss modulus), tan delta (E'/E") also known as a damping factor, and $T_m$ (melt temperature). More specifically, E' corresponds to a stiffness, i.e., a compressive strength of the Foams, at varying temperatures. These values depend on the density of the Foams. Typically, stiffness of the Foams tends to decrease as damping (i.e., tan delta) increases. E" corresponds to an energy of dissipation/absorption within the Foams. The peak of E" depicts an onset of a glass-transition or an onset of a softening transition of the Foams. The temperature at which this occurs is known as the glass transition temperature, $T_g$. These values also depend on the density of the Foams. A peak in tan delta curve also corresponds to the glass-transition temperature, $T_g$. The breadth of the tan delta peak corresponds to a distribution of the molecular weight of polymer chains within the Foams that go through particular transitions. Narrower peaks indicate homogenous polyurethane/urea structure due to a completion of cure or presence of a homogeneous isocyanate mixture/polyol mixture. The height of the peak indicates the strength of cross-linking. Higher peaks indicate a lower strength of cross-linking. These values are independent of the density of the Foams. The melt temperature is the temperature at which the Foams start to flow and the temperature at which large-scale polymer chain slippage occurs. The value can be taken from the E' or E" plot.

Dishwasher Evaluations:

Nine identical dishwashers (Dishwashers 1-9) are evaluated to determine Sound Pressure Level (db) as a Function of Third Octave Center Frequency (Hz) according to IEC 60704-2-3. These evaluations take place as the Dishwashers are running in standard washing or draining modes. Said differently, the nine dishwashers are evaluated to determine an amount of noise produced during normal use.

The dishwashers are premium consumer models that have the following approximate dimensions: 24 in. wide×34 in. tall×24 in. deep. Some of the dishwashers are evaluated without modification, i.e., as they are commercially available. These dishwashers are used for comparative purposes. Other dishwashers are modified to remove any external insulating and sound proofing materials that are typically included in commercial use. These dishwashers are also used for comparison purposes. Other dishwashers are modified with the Comparative Foam 1 described above. These dishwashers are also used for comparison purposes. Additional dishwashers are modified with the Foams 1-3 and represent examples the instant invention. These various dishwashers and examples are described in below.

Sprayed Doors of Dishwasher 1-4:

Dishwashers 1-4 are evaluated to determine Sound Pressure Level (db) as a Function of Third Octave Center Frequency (Hz) according to IEC 60704-2-3. Dishwashers 1-4 vary relative to an amount of insulating and sound proofing materials on or in the doors of the dishwashers.

Dishwasher 1 is evaluated in its commercially available configuration without any insulating and sound proofing material added or removed. Accordingly, approximately ⅛ to ¼ inch of Mastic 1 is disposed on the side walls, rear walls, top panel, and bottom panel of the dishwasher by the original manufacturer. The original manufacturer also disposes a polyethylene terephthalate (PET) fiber blanket, ½ to ¾ in. thick, against the side walls and top panel, and inside the front panel (door).

The door of Dishwasher 2 is modified with the Comparative Foam 1 described above sprayed to a thickness of approximately ½ inch across an entirety of the door. Approximately ⅛ to ¼ inch of Mastic 1 is disposed on the side walls, rear walls, top panel, and bottom panel of the dishwasher by the original manufacturer. The original manufacturer also disposes a polyethylene terephthalate (PET) fiber blanket, ½ to ¾ in. thick, against the side walls and top panel, but not inside the front panel (door). No additional insulating or sound proofing material is added or removed.

The door of Dishwasher 3 is modified with Foam 1, as described above, sprayed to a thickness of approximately ½ inch across an entirety of the door. Approximately ⅛ to ¼ inch of Mastic 1 is disposed on the side walls, rear walls, top panel, and bottom panel of the dishwasher by the original manufacturer. The original manufacturer also disposes a polyethylene terephthalate (PET) fiber blanket, ½ to ¾ in.

thick, against the side walls and top panel, but not inside the front panel (door). No additional insulating or sound proofing material is added or removed.

The door of Dishwasher 4 is modified with Foam 2, as described above, sprayed to a thickness of approximately ½ inch across an entirety of the door. Approximately ⅛ to ¼ inch of Mastic 1 is disposed on the side walls, rear walls, top panel, and bottom panel of the dishwasher by the original manufacturer. The original manufacturer also disposes a polyethylene terephthalate (PET) fiber blanket, ½ to ¾ in. thick, against the side walls and top panel, but not inside the front panel (door). No additional insulating or sound proofing material is added or removed.

Figure 10:
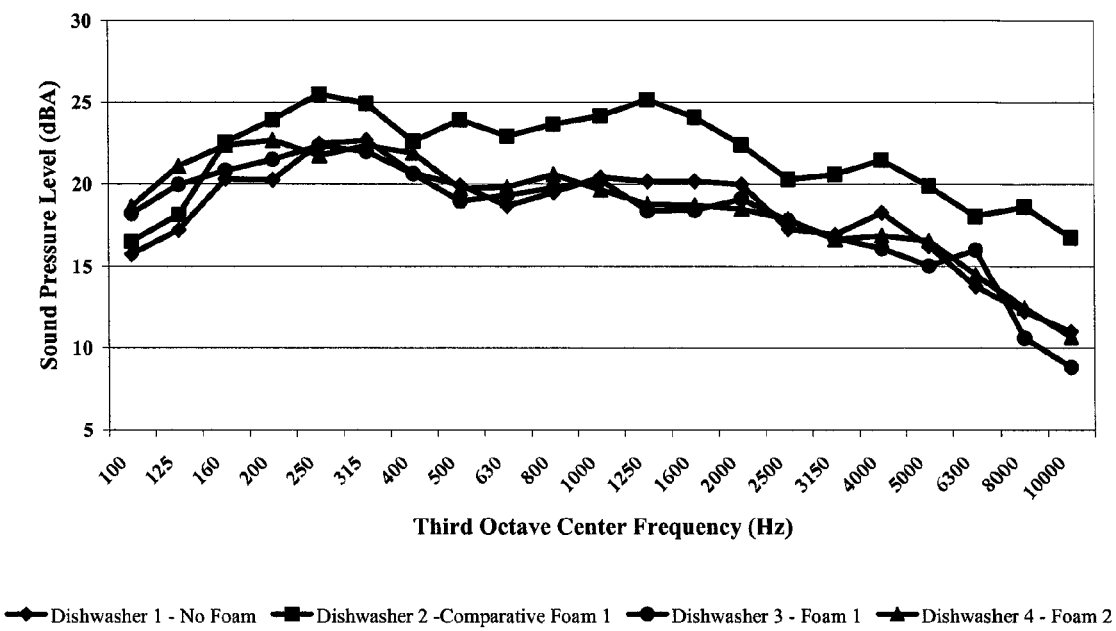
FIG. 10 is a graph that illustrates sound pressure level (dBA) as a function of third octave center frequency (Hz) of Dishwashers 1-4 of the Examples operating in a standard washing mode.

The Dishwashers 1-4 are evaluated to determine Sound Pressure Level (db) as a Function of Third Octave Center Frequency (Hz) according to IEC 60704-2-3. The results of these evaluations are set forth in Table 2 below and also graphically represented in FIG. 10.

TABLE 2

| Third Octave Frequency (Hz) | Sound Pressure Level (db) of Dishwasher 1 (Comparative) | Sound Pressure Level (db) of Dishwasher 2 (Comparative) | Sound Pressure Level (db) of Dishwasher 3 (Invention) | Sound Pressure Level (db) of Dishwasher 4 (Invention) |
|---|---|---|---|---|
| 100 | 15.7 | 16.5 | 18.2 | 18.7 |
| 125 | 17.2 | 18.2 | 20.0 | 21.1 |
| 160 | 20.3 | 22.6 | 20.9 | 22.4 |
| 200 | 20.3 | 24.0 | 21.5 | 22.7 |
| 250 | 22.5 | 25.5 | 22.4 | 21.8 |
| 315 | 22.7 | 24.9 | 22.0 | 22.4 |
| 400 | 20.7 | 22.6 | 20.7 | 21.9 |
| 500 | 20.0 | 23.9 | 19.0 | 19.7 |
| 630 | 18.7 | 23.0 | 19.4 | 19.9 |
| 800 | 19.5 | 23.7 | 19.8 | 20.6 |
| 1000 | 20.4 | 24.2 | 20.3 | 19.7 |
| 1250 | 20.2 | 25.2 | 18.4 | 18.8 |
| 1600 | 20.2 | 24.1 | 18.4 | 18.7 |
| 2000 | 20.0 | 22.4 | 19.1 | 18.5 |
| 2500 | 17.3 | 20.3 | 17.8 | 17.9 |
| 3150 | 16.9 | 20.6 | 16.7 | 16.7 |
| 4000 | 18.3 | 21.5 | 16.1 | 16.9 |
| 5000 | 16.2 | 19.9 | 15.0 | 16.6 |
| 6300 | 13.8 | 18.1 | 16.0 | 14.5 |
| 8000 | 12.3 | 18.7 | 10.6 | 12.5 |
| 10000 | 11.0 | 16.8 | 8.8 | 10.7 |
| Mean | 18.3 | 21.7 | 18.2 | 18.7 |

The data set forth immediately above suggests that the Dishwashers 3 and 4 (which include the Foams 1 and 2) of this invention perform generally as well as the Dishwasher 1 (no foam), relative to noise reduction. Moreover, the data suggests that the Dishwashers 3 and 4 perform better than Dishwasher 2, which includes Comparative Foam 1. In other words, the Dishwashers 3 and 4 are produce about as much noise as Dishwasher 1 and less noise than Dishwasher 2.

Sprayed Dishwashers 5-8:

Dishwashers 5-8 are also evaluated to determine Sound Pressure Level (db) as a Function of Third Octave Center Frequency (Hz) according to IEC 60704-2-3. These evaluations take place as the Dishwashers are operating in standard washing mode. Dishwashers 5-8 vary relative to an amount of insulating and sound proofing materials applied on all sides of the Dishwashers.

Before evaluation, Dishwasher 5 is modified to remove all insulating and soundproofing materials from the exterior. No additional insulating or sound proofing material is added or removed.

Dishwasher 6 is evaluated in its commercially available configuration, as described relative to Dishwasher 1, without any insulating and sound proofing material added or removed.

Dishwasher 7 is modified to remove all insulating and soundproofing materials from the exterior. Subsequently, Dishwasher 7 is modified with Foam 3 that is sprayed on all sides (front wall, side walls, rear walls, top panel, and bottom panel) to a thickness of approximately ½ inch. No additional insulating or sound proofing material is added or removed.

Dishwasher 8 is modified to remove all insulating and soundproofing materials from the exterior. Subsequently, Dishwasher 8 is modified with Foam 3 that is sprayed on all sides (front wall, side walls, rear walls, top panel, and bottom panel) to a thickness of approximately ½ inch. Additionally, a polyurethane elastomer is sprayed onto Foam 3 as an outermost layer to a thickness of approximately ½ inch. The polyurethane elastomer is formed from a resin composition reacted with an isocyanate composition. The components of these compositions are set forth below in parts by weight

| | Parts by Weight |
|---|---|
| Resin Composition | |
| Pluracol ® 1421 | 42.25 |
| Polyetheramine D 2000 | 17 |
| Poly EDA 800 | 8 |
| Diethyleneglycol | 6 |
| Monoethyleneglycol | 6 |
| Ethacure ® 100 | 6 |
| UOP Unilink ® 4200 | 3 |
| Lupragen ® N 201 | 3 |
| Dayglo ® Black Pop 4544 | 5 |
| Elastocast ® Burlit 6 | 3.75 |
| Isocyanate Composition | |
| Pluracol ® 1421 | 30 |
| Lupranate ® MM103 | 70 |

Figure 11:
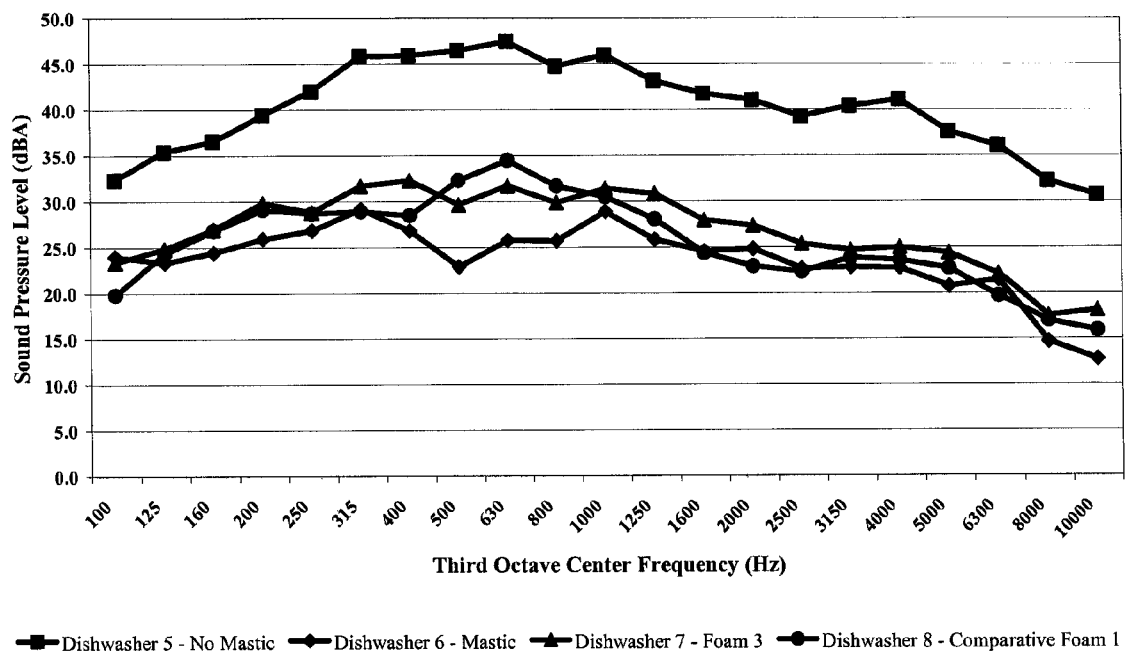
FIG. 11 is a graph that illustrates sound pressure level (dBA) as a function of third octave center frequency (Hz) of Dishwashers 5-8 of the Examples operating in a standard washing mode.

The Dishwashers 5-8 are evaluated to determine Sound Pressure Level (db) as a Function of Third Octave Center Frequency (Hz) according to IEC 60704-2-3. The results of these evaluations are set forth in Table 4 below and also graphically represented in FIG. 11.

TABLE 4

| Third Octave Frequency (Hz) | Sound Pressure Level (db) of Dishwasher 5 (Comparative) | Sound Pressure Level (db) of Dishwasher 6 (Comparative) | Sound Pressure Level (db) of Dishwasher 7 (Invention) | Sound Pressure Level (db) of Dishwasher 8 (Invention) |
|---|---|---|---|---|
| 100 | 32.4 | 24.0 | 23.4 | 19.8 |
| 125 | 35.4 | 23.3 | 24.8 | 24.3 |
| 160 | 36.6 | 24.4 | 26.9 | 26.8 |
| 200 | 39.4 | 25.9 | 29.9 | 29.1 |
| 250 | 42.0 | 26.8 | 28.8 | 28.7 |
| 315 | 45.8 | 29.2 | 31.7 | 29.0 |
| 400 | 45.9 | 26.8 | 32.3 | 28.5 |
| 500 | 46.5 | 22.9 | 29.6 | 32.3 |
| 630 | 47.5 | 25.8 | 31.7 | 34.5 |
| 800 | 44.8 | 25.7 | 29.9 | 31.7 |
| 1000 | 46.0 | 28.9 | 31.4 | 30.5 |
| 1250 | 43.2 | 25.8 | 30.9 | 28.1 |
| 1600 | 41.8 | 24.6 | 27.9 | 24.4 |
| 2000 | 41.0 | 24.8 | 27.3 | 22.9 |
| 2500 | 39.3 | 22.7 | 25.4 | 22.3 |
| 3150 | 40.4 | 22.8 | 24.7 | 23.9 |
| 4000 | 41.1 | 22.7 | 25.0 | 23.6 |

TABLE 4-continued

| Third Octave Frequency (Hz) | Sound Pressure Level (db) of Dishwasher 5 (Comparative) | Sound Pressure Level (db) of Dishwasher 6 (Comparative) | Sound Pressure Level (db) of Dishwasher 7 (Invention) | Sound Pressure Level (db) of Dishwasher 8 (Invention) |
|---|---|---|---|---|
| 5000 | 37.6 | 20.8 | 24.4 | 22.7 |
| 6300 | 36.1 | 21.5 | 22.1 | 19.7 |
| 8000 | 32.2 | 14.7 | 17.5 | 17.0 |
| 10000 | 30.7 | 12.8 | 18.1 | 15.9 |
| Mean | 40.3 | 23.7 | 26.9 | 25.5 |

The data set forth immediately above suggests that Dishwashers 7 and 8 (which include Foam 3) of this invention perform generally as well as Dishwasher 6, relative to noise reduction. Moreover, the data suggests that Dishwashers 7 and 8 perform better than Dishwasher 5. In other words, Dishwashers 7 and 8 produces about as much noise as Dishwasher 6 and less noise than Dishwasher 5.

Sprayed Dishwashers 1, 2, and 9:

Dishwashers 1, 2, and 9 are also evaluated while operating in a standard draining mode to determine Sound Pressure Level (db) as a Function of Third Octave Center Frequency (Hz) according to IEC 60704-2-3. The door of Dishwasher 9 is modified with Foam 3, as described above, sprayed to a thickness of approximately ½ inch across an entirety of the door. Additionally, the polyurethane elastomer described above is sprayed onto Foam 3 as an outermost layer to a thickness of approximately ½ inch.

Figure 12:
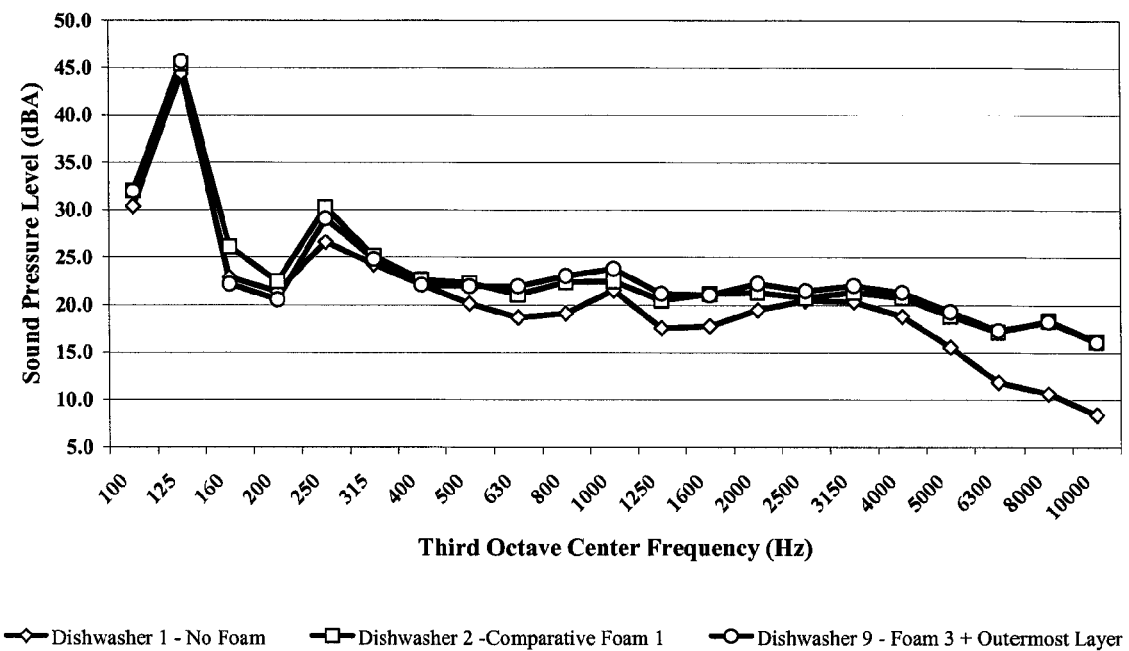
FIG. 12 is a graph that illustrates sound pressure level (dBA) as a function of third octave center frequency (Hz) of Dishwashers 1, 2, and 9 of the Examples operating in a standard draining mode.

The results of these evaluations are set forth in Table 5 below and also graphically represented in FIG. 12.

TABLE 5

| Third Octave Frequency (Hz) | Sound Pressure Level (db) of Dishwasher 1 (Comparative) | Sound Pressure Level (db) of Dishwasher 2 (Comparative) | Sound Pressure Level (db) of Dishwasher 9 (Invention) |
|---|---|---|---|
| 100 | 30.4 | 32.0 | 32.0 |
| 125 | 44.4 | 45.5 | 45.7 |
| 160 | 22.9 | 26.1 | 22.2 |
| 200 | 21.4 | 22.5 | 20.5 |
| 250 | 26.6 | 30.2 | 29.1 |
| 315 | 24.3 | 25.1 | 24.8 |
| 400 | 22.1 | 22.7 | 22.1 |
| 500 | 20.1 | 22.3 | 22.0 |
| 630 | 18.7 | 21.1 | 22.0 |
| 800 | 19.1 | 22.4 | 23.1 |
| 1000 | 21.5 | 22.5 | 23.8 |
| 1250 | 17.6 | 20.5 | 21.2 |
| 1600 | 17.8 | 21.2 | 21.1 |
| 2000 | 19.5 | 21.3 | 22.3 |
| 2500 | 20.5 | 20.8 | 21.5 |
| 3150 | 20.4 | 21.3 | 22.1 |
| 4000 | 18.8 | 20.8 | 21.3 |
| 5000 | 15.6 | 18.9 | 19.3 |
| 6300 | 11.9 | 17.2 | 17.3 |
| 8000 | 10.6 | 18.4 | 18.3 |
| 10000 | 8.4 | 16.2 | 16.1 |
| Mean | 20.6 | 23.3 | 22.2 |

The data set forth immediately above suggests that Dishwasher 9 of this invention performs generally as well as Dishwasher 1 and better than Dishwasher 2, relative to noise reduction during the standard draining mode. In other words, Dishwasher 9 produces about as much noise as Dishwasher 1 and less noise than Dishwasher 2 during the standard draining mode.

The Dishwashers 6 and 7 are further evaluated to determine Energy Consumption (Watts) in standard washing mode determined according to the Energy Conservation Program for Consumer Products set forth in 10 CFR §430. The results of these evaluations are set forth in Table 6 immediately below as an average of two measurements over a complete normal wash and dry cycle. This data suggests that the Dishwasher 7 of this invention uses less energy, and thus is less expensive to operate, than Dishwasher 6.

TABLE 6

| Energy Consumption (Watt-Hours) | Dishwasher 6 (Comparative) | Dishwasher 7 (Invention) |
|---|---|---|
| | 1080 | 800 |

Evaluation of Structural Resonance/Damping:

The Foams 1, 2, and 3, the Comparative Foam 1, and the Mastic 1 are also evaluated in a structural resonance test (i.e., a damping test) measured in Sound Level (db) as a Function of Frequency (Hz) across a spectrum of 0-1600 Hz at various temperatures of approximately 27° C.-31° C., 40° C.-42° C., and 55° C.-59° C.

In these evaluations, each of the Foams 1, 2, and 3, the Comparative Foam 1, and the Mastic 1 are independently applied to one side of identical stainless steel panels (AK Steel 430 bright annealed, 12 in. wide×12 in. long×0.02 in. thick) to a thickness of approximately 0.5 in. thick. Prior to evaluation, each of the stainless steel panels is pre-conditioned in a convection oven at the desired temperatures (i.e., at 27° C.-31° C., 40° C.-42° C., or 55° C.-59° C.).

Figure 13A:
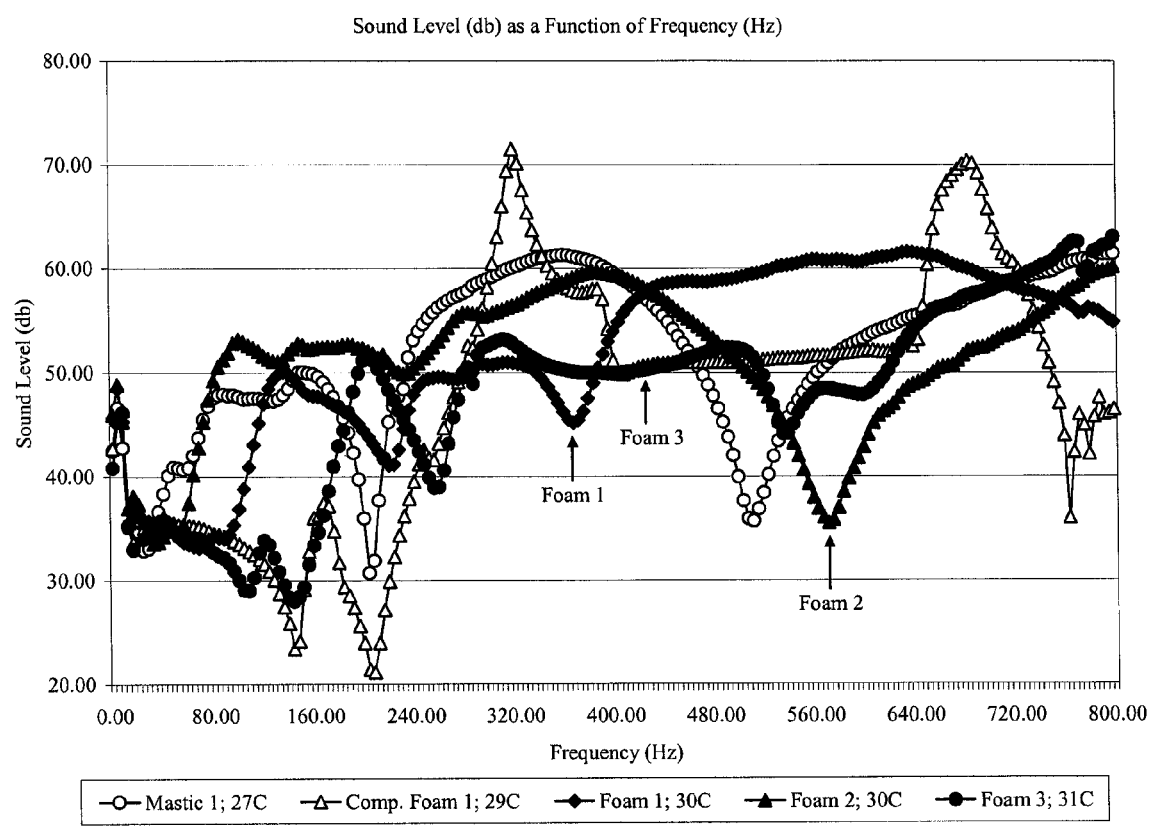
FIG. 13A is a graph illustrating structural resonance testing (i.e., damping) data of Foams 1, 2, and 3, Comparative Foam 1, and Mastic 1 of the Examples measured in Sound Level (db) as a Function of Frequency (Hz) across a spectrum of 0-800 Hz at temperatures of approximately 27° C.-31° C.
Figure 13B:
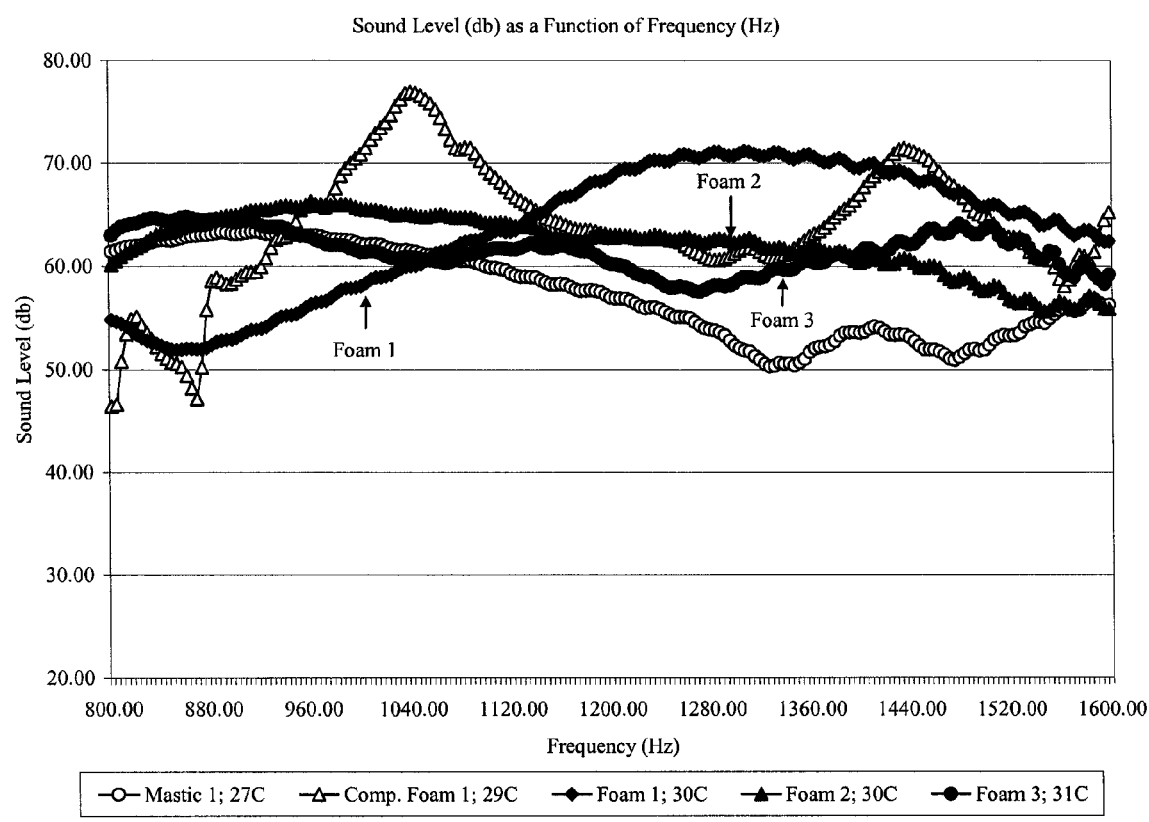
FIG. 13B is a graph illustrating structural resonance testing (i.e., damping) data of Foams 1, 2, and 3, Comparative Foam 1, and Mastic 1 of the Examples measured in Sound Level (db) as a Function of Frequency (Hz) across a spectrum of 800-1600 Hz at temperatures of approximately 27° C.-31° C.
Figure 14A:
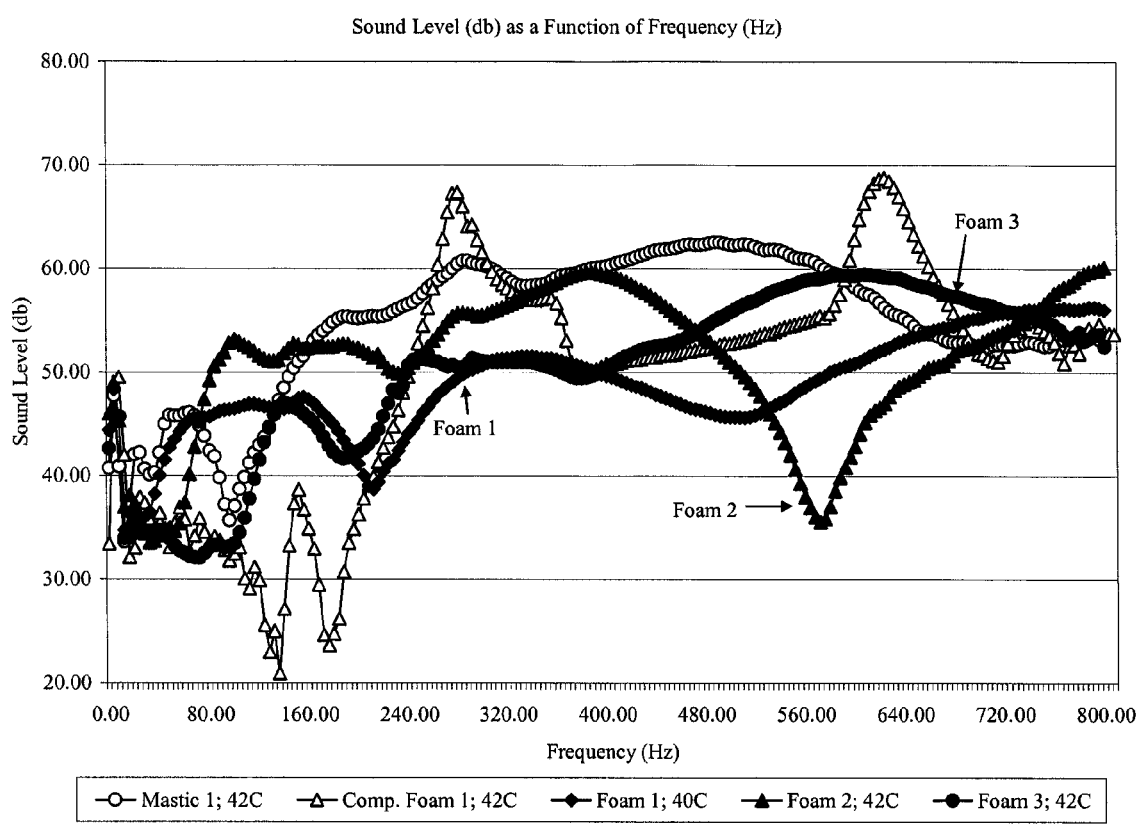
FIG. 14A is a graph illustrating structural resonance testing (i.e., damping) data of Foams 1, 2, and 3, Comparative Foam 1, and Mastic 1 of the Examples measured in Sound Level (db) as a Function of Frequency (Hz) across a spectrum of 0-800 Hz at temperatures of approximately 40° C.-42° C.
Figure 14B:
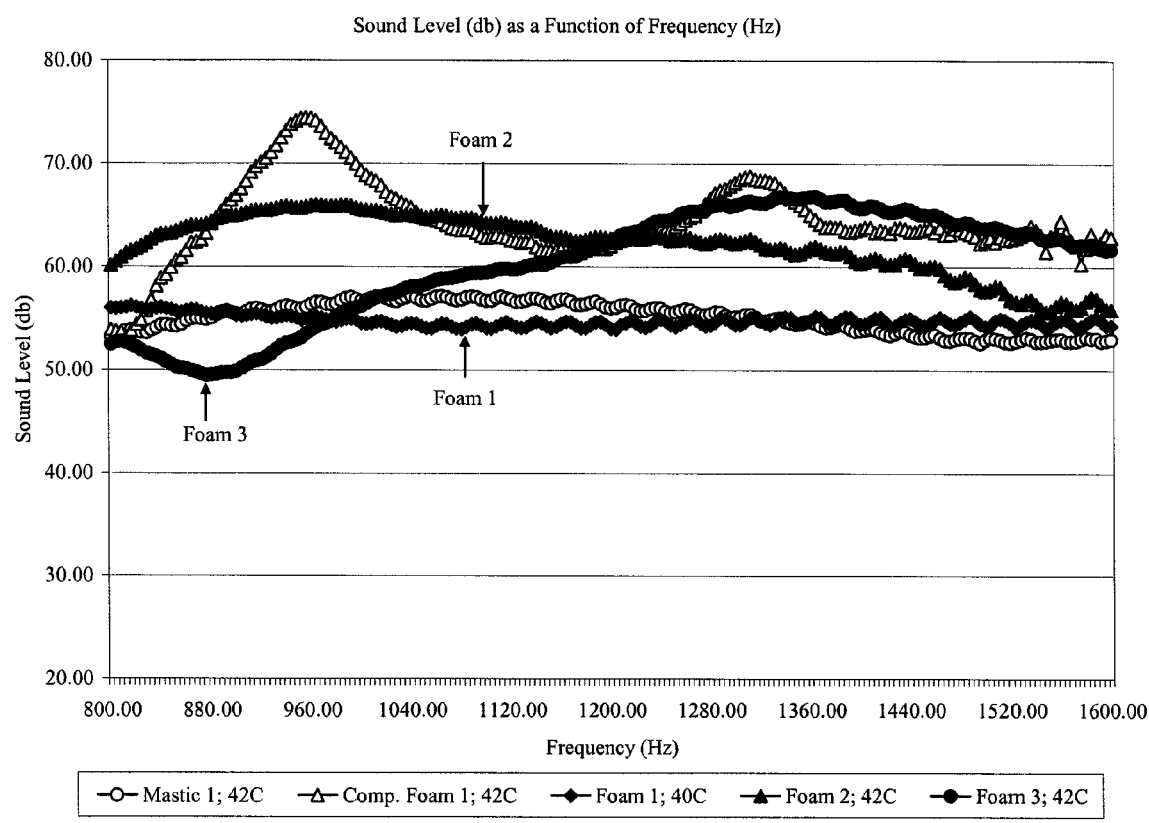
FIG. 14B is a graph illustrating structural resonance testing (i.e., damping) data of Foams 1, 2, and 3, Comparative Foam 1, and Mastic 1 of the Examples measured in Sound Level (db) as a Function of Frequency (Hz) across a spectrum of 800-1600 Hz at temperatures of approximately 40° C.-42° C.
Figure 15A:
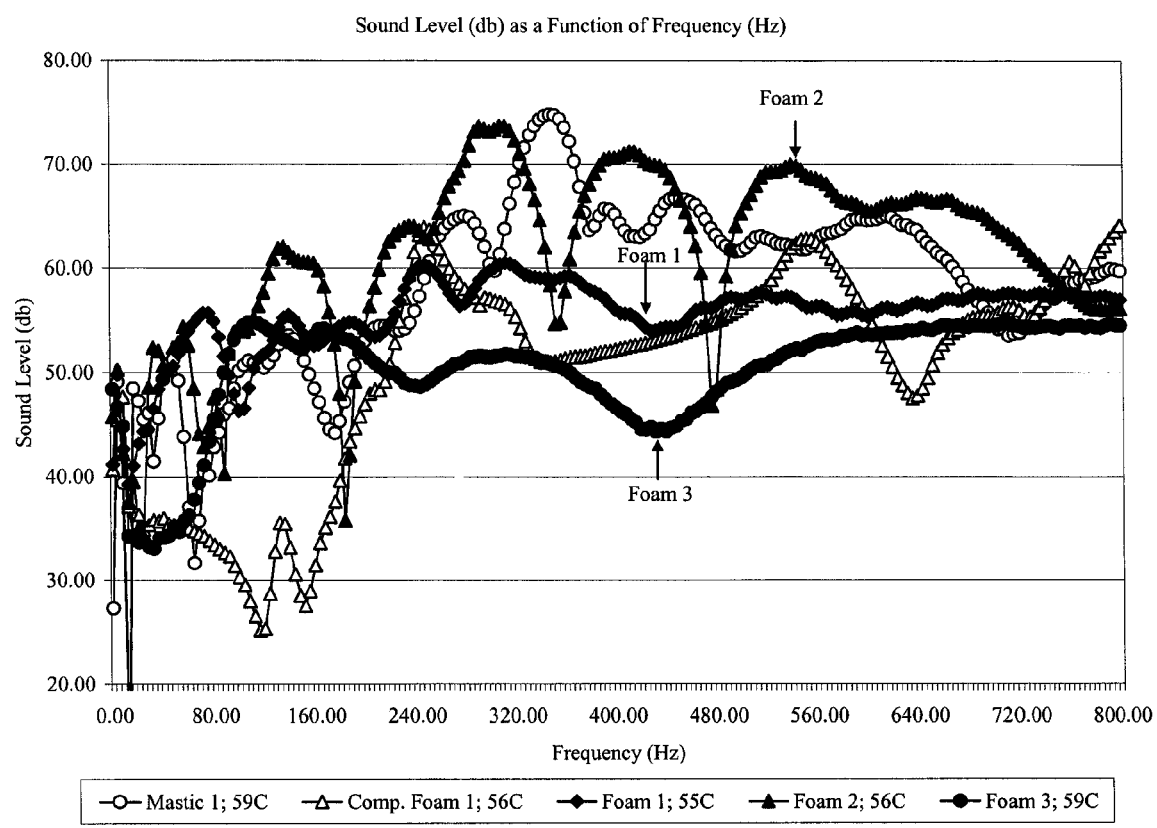
FIG. 15A is a graph illustrating structural resonance testing (i.e., damping) data of Foams 1, 2, and 3, Comparative Foam 1, and Mastic 1 of the Examples measured in Sound Level (db) as a Function of Frequency (Hz) across a spectrum of 0-800 Hz at temperatures of approximately 55° C.-59° C.
Figure 15B:
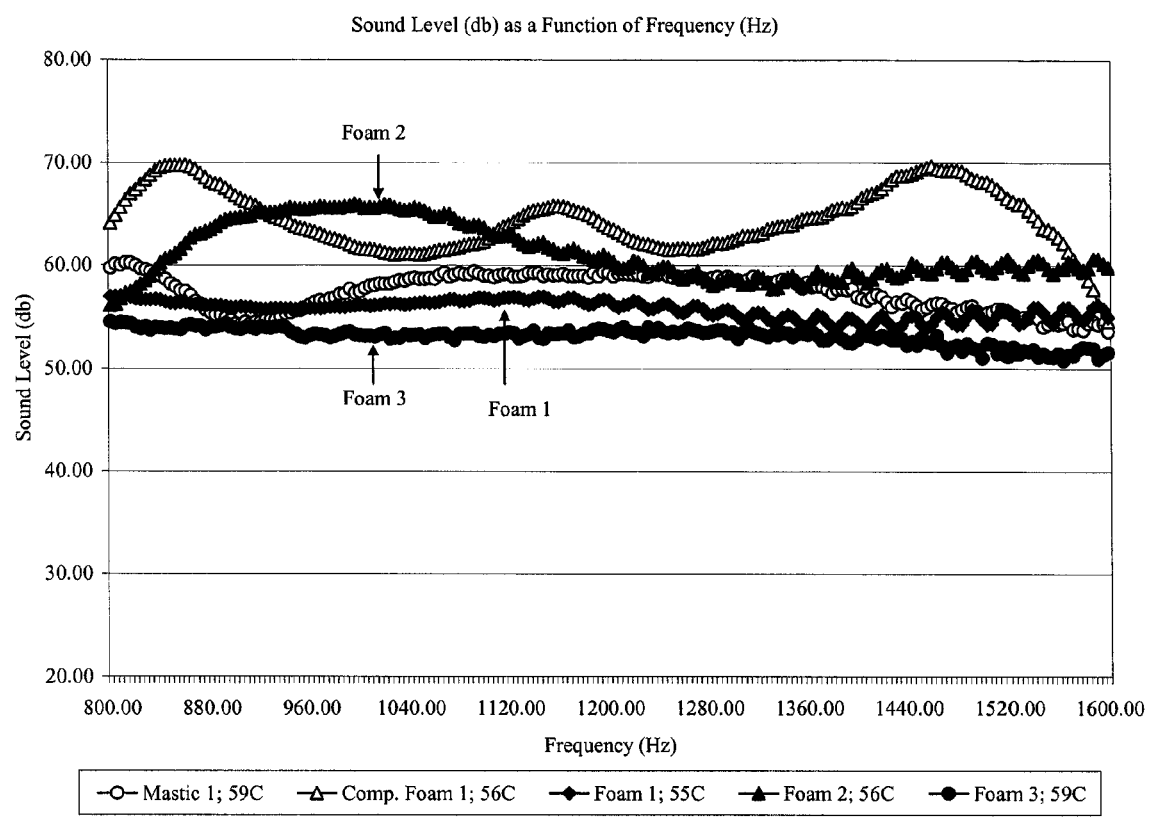
FIG. 15B is a graph illustrating structural resonance testing (i.e., damping) data of Foams 1, 2, and 3, Comparative Foam 1, and Mastic 1 of the Examples measured in Sound Level (db) as a Function of Frequency (Hz) across a spectrum of 800-1600 Hz at temperatures of approximately 55° C.-59° C.

The stainless steel panels are suspended, with an uncoated side up, from a square frame using rubber bands. An accelerometer (PCB model 352C68) is placed 4.5 in.×4.5 in. from one corner of each of the stainless steel panels and secured using adhesive (Loctite 454). The stainless steel panels are then struck at a point 4.5 in.×4.5 in. from a diagonally opposite corner using a modally tuned impact hammer (PCB Model 086CO3 and medium tip). A PULSE data acquisition system and software (Bruel and Kjaer) is used to measure, calculate, and record a sound level (i.e., vibration response) in decibels (db) as a function of vibration frequency (Hz). Each vibration response is scaled to the peak force applied by the hammer and reported as an average of ten measurements. The data acquired from the evaluations of structural resonance are presented graphically in FIGS. 13-15.

In analyzing the results of the structural resonance test, broad peaks and low decibel measurements are most desirable and are indicative of effective damping and sound reduction. The data set forth in FIGS. 13-15 suggests that as the temperature increases, the peaks are narrowed and sharpened. Typically, as temperature increases, the Foams 1, 2, and 3, the Comparative Foam 1, and the Mastic 1 increase in elasticity and exhibit less damping. In sum, the data set forth in FIGS. 13-15 suggests that the Foams 1-3 of the instant invention effectively dissipate noise and vibration approximately as well or better than the Comparative Foam 1 and the Mastic 1. Relative to the Comparative Foam 1, this foam is typically classified as a rigid foam that does not provide much damping, particularly at high frequencies where sharp peaks are observed. In addition to the improved damping, described above, the instant invention simultaneously reduces an amount of energy needed to operate the dishwashers.

The data set forth in the Examples demonstrates that disposing the polyurethane foam of the instant invention about the outermost surface of an appliance, such as a dishwasher, produces synergistic results. More specifically, the polyurethane foam of this invention not only minimizes noise and vibrations but simultaneously decreases an amount of energy required to operate the appliance. Although some of the comparative examples above exhibit similar reduction in noise and vibrations, all of the comparative examples require more energy to operate and thus are more expensive to operate than the instant invention. In the instant invention, the use of the particular polyurethane foam allows the appliances to be more energy efficient and quieter, both of which are commercially desirable. Moreover, the instant invention allows appliances to meet current federal and future Energy Star Requirements without detracting from the commercial desirability of operating with decreased noise and vibration. Accordingly, the instant invention represents much more than a simple additive effect of using a first material to deaden sound and a second material to insulate.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A method of forming an appliance comprising a housing having a top panel and a bottom panel that are disposed opposite each other and also having a plurality of walls connected to the top and bottom panels, wherein the top and bottom panels and the plurality of walls define a cavity and wherein the housing has an outermost surface, said method comprising the step of applying a polyurethane foam about at least a portion of the outermost surface wherein the polyurethane foam comprises the reaction product of an isocyanate composition and a resin composition comprising at least one polyol, and has (1) a density of from 20 to 50 pounds per cubic foot as determined according to ASTM D 1622, (2) a damping factor of at least 0.2 measured at a temperature of from 40° C. to 60° C. as determined according to ASTM D 4065, and (3) a K-factor of less than 2.0 btu-in/hr-ft$^2$-° F. as determined according to ASTM C 518.

2. A method as set forth in claim 1 wherein the resin composition comprises from 1 to 2 parts by weight of a polymerization catalyst per 100 parts by weight of the resin composition.

3. A method as set forth in claim 2 wherein the step of applying the polyurethane foam is further defined as applying the polyurethane foam to at least one of the top panel, bottom panel, and plurality of walls before the top panel and bottom panel are connected by the plurality of walls.

4. A method as set forth in claim 3 wherein the polyurethane foam is applied to at least a portion of each of the top and bottom panels and the plurality of walls.

5. A method as set forth in claim 3 wherein the polyurethane foam is applied to at least a portion of each of the top panel and the plurality of walls.

6. A method as set forth in claim 1 wherein the step of applying the polyurethane foam is further defined as applying the polyurethane foam to at least a portion of at least one of the top panel, bottom panel, and plurality of walls after the top panel and bottom panel are connected by the plurality of walls.

7. A method as set forth in claim 6 further wherein the polyurethane foam is applied to at least a portion of each of the top and bottom panels and the plurality of walls.

8. A method as set forth in claim 6 wherein the polyurethane foam is applied to at least a portion of each of the top panel and the plurality of walls.

9. A method as set forth in claim 1 further comprising the step of applying an outermost layer on at least a portion of the polyurethane foam sandwiching the polyurethane foam between the outermost layer and the outermost surface of the housing, wherein the outermost layer has a density that is greater than a density of the polyurethane foam.

10. A method as set forth in claim 9 wherein the outermost layer comprises a polyurethane elastomer, a polyurea elastomer, a polyurethane-polyurea hybrid elastomer, or combinations thereof.

11. A method as set forth in claim 9 wherein the resin composition comprises a diol and a triol, each having a number average molecular weight of less than 1,000 g/mol, and wherein the isocyanate composition comprises an isocyanate prepolymer.

12. A method as set forth in claim 11 wherein the isocyanate composition comprises less than 30 percent by weight of polymeric methylene diphenyl diisocyanate.

13. A method as set forth in claim 12 wherein the polyurethane foam has a glass transition temperature of from 30° C. to 60° C. determined according to ASTM D 4065, wherein the density is further defined as from 25 to 35 pounds per cubic foot as determined according to ASTM D 1622, wherein the damping factor is further defined as greater than 0.5 measured at a temperature of from 40° C. to 60° C. as determined according to ASTM D 4065, and wherein the appliance is further defined as a dishwasher.

14. A method as set forth in claim 13 wherein the outermost layer comprises a polyurethane-polyurea hybrid elastomer.

15. A method as set forth in claim 11 wherein the polyurethane foam has a glass transition temperature of from 30° C. to 60° C. determined according to ASTM D 4065, wherein the density is further defined as from 25 to 35 pounds per cubic foot as determined according to ASTM D 1622, wherein the damping factor is further defined as greater than 0.5 measured at a temperature of from 40° C. to 60° C. as determined according to ASTM D 4065, and wherein the appliance is further defined as a dishwasher.

16. A method as set forth in claim 15 wherein the outermost layer comprises a polyurethane-polyurea hybrid elastomer.

17. A method as set forth in claim 9 wherein the outermost layer comprises a polyurethane-polyurea hybrid elastomer.

18. A method as set forth in claim 17 wherein the polyurethane foam has a glass transition temperature of from 30° C. to 60° C. determined according to ASTM D 4065, wherein the density is further defined as from 25 to 35 pounds per cubic foot as determined according to ASTM D 1622, wherein the damping factor is further defined as greater than 0.5 measured at a temperature of from 40° C. to 60° C. as determined according to ASTM D 4065, and wherein the appliance is further defined as a dishwasher.

19. A method as set forth in claim 1 wherein the resin composition comprises a diol and a triol, each having a number average molecular weight of less than 1,000 g/mol, and wherein the isocyanate composition comprises an isocyanate prepolymer.

20. A method as set forth in claim 19 wherein the polyurethane foam has a glass transition temperature of from 30° C. to 60° C. determined according to ASTM D 4065, wherein the density is further defined as from 25 to 35 pounds per cubic foot as determined according to ASTM D 1622, wherein the damping factor is further defined as greater than 0.5 measured at a temperature of from 40° C. to 60° C. as determined according to ASTM D 4065, and wherein the appliance is further defined as a dishwasher.

21. A method as set forth in claim 20 further comprising the step of applying an outermost layer on at least a portion of the polyurethane foam sandwiching the polyurethane foam between the outermost layer and the outermost surface of the housing, wherein the outermost layer has a density that is greater than a density of the polyurethane foam.

22. A method as set forth in claim 21 wherein the outermost layer comprises a polyurethane-polyurea hybrid elastomer.

23. A method as set forth in claim 1 wherein the polyurethane foam has a glass transition temperature of from 30° C. to 60° C. determined according to ASTM D 4065.

24. A method as set forth in claim 1 wherein the density is further defined as from 25 to 35 pounds per cubic foot as determined according to ASTM D 1622.

25. A method as set forth in claim 1 wherein the damping factor is further defined as greater than 0.5 measured at a temperature of from 40° C. to 60° C. as determined according to ASTM D 4065.

26. A method as set forth in claim 1 wherein the appliance is further defined as a dishwasher.

27. A method as set forth in claim 1 wherein the polyurethane foam has a glass transition temperature of from 30° C. to 60° C. determined according to ASTM D 4065, wherein the density is further defined as from 25 to 35 pounds per cubic foot as determined according to ASTM D 1622, wherein the damping factor is further defined as greater than 0.5 measured at a temperature of from 40° C. to 60° C. as determined according to ASTM D 4065, and wherein the appliance is further defined as a dishwasher.

28. A method of forming a dishwasher comprising a housing having a top panel and a bottom panel that are disposed opposite each other and also having a plurality of walls connected to the top and bottom panels, wherein the top and bottom panels and the plurality of walls define a cavity and wherein the housing has an outermost surface, said method comprising the step of applying a polyurethane foam about at least a portion of the outermost surface, wherein the polyurethane foam comprises the reaction product of an isocyanate composition and a resin composition comprising at least one polyol, and has (1) a density of from 20 to 50 pounds per cubic foot as determined according to ASTM D 1622, (2) a damping factor of at least 0.2 measured at a temperature of from 40° C. to 60° C. as determined according to ASTM D 4065, (3) a K-factor of less than 2.0 btu-in/hr-ft$^2$-° F. as determined according to ASTM C 518, and (4) a glass transition temperature of from 30° C. to 60° C. determined according to ASTM D 4065.

* * * * *